United States Patent [19]

Heintz

[11] Patent Number: 4,590,909
[45] Date of Patent: May 27, 1986

[54] VEHICLE SPEED CONTROL

[75] Inventor: Richard P. Heintz, Kalamazoo, Mich.

[73] Assignee: Deaccelerator Corporation, Kalamazoo, Mich.

[21] Appl. No.: 611,642

[22] Filed: May 18, 1984

[51] Int. Cl.[4] ............................................. F02D 41/14
[52] U.S. Cl. .................................... 123/360; 123/378; 180/176
[58] Field of Search ............... 123/350, 378, 396, 401, 123/360; 180/175, 176, 177, 170

[56] References Cited

U.S. PATENT DOCUMENTS

| | | | |
|---|---|---|---|
| 3,721,309 | 3/1973 | Donaldson | 123/376 |
| 3,954,152 | 5/1976 | Duttarer et al. | 123/378 |
| 4,248,193 | 2/1981 | Choma et al. | 123/350 |
| 4,270,501 | 6/1981 | Breen et al. | 123/350 |
| 4,345,663 | 8/1982 | Shields | 123/350 |

*Primary Examiner*—William A. Cuchlinski, Jr.
*Attorney, Agent, or Firm*—Flynn, Thiel, Boutell & Tanis

[57] ABSTRACT

A position control device for use in association with a foot pedal member controlling the fuel flow to an engine of a vehicle. The device includes an elongated and hollow chamber means and an actuator piston slidably disposed in the chamber means and movable between first and second positions therein. The first position represents a position of maximum fuel supply to the engine. Structure separately supporting the foot pedal member is provided for movement between first and second positions but permitting an operative connection of the foot pedal member to the actuator piston for movement along a path. A control device is provided for controlling the position of the actuator piston between the first and second positions and in response to vehicle speed and includes a yieldable resistance device for causing the actuator piston to resist a change in the position of the foot pedal member if an effort is made to alter the position of the foot pedal member toward the first position to increase the fuel supply to the engine and beyond the position of the actuator piston determined by the control means while simultaneously permitting an overpowering of the yieldable resistance device to effect a yieldable movement of the foot pedal member and the actuator piston together along the path to vary the fuel supply to the engine.

29 Claims, 20 Drawing Figures

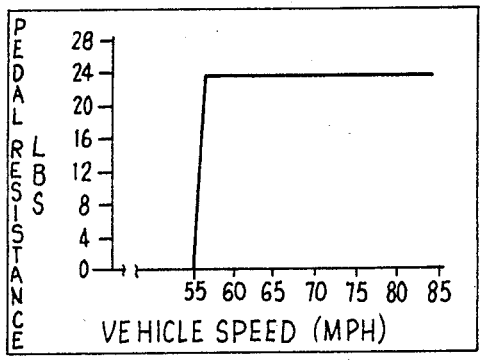

FIG. 1

A Single Value of
Imposed Accelerator Pedal
Resistance as a Function of
Speed in Excess of 55 mph

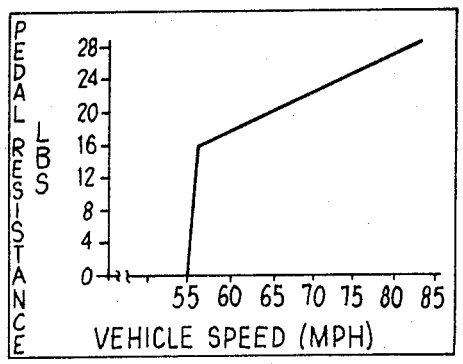

FIG. 2

Linear Increases and Decreases
in Imposed Accelerator Pedal Resistance
as a Function of
Respective Increases and Decreases
in Speed Above 55 mph

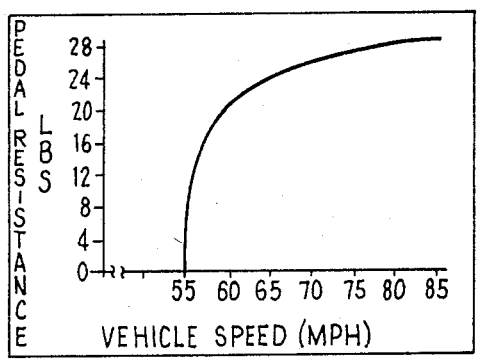

FIG. 3

Negatively Accelerated Distribution of
Imposed Accelerator Pedal Resistance
As a Function of
Unlawful Highway Vehicle Speed

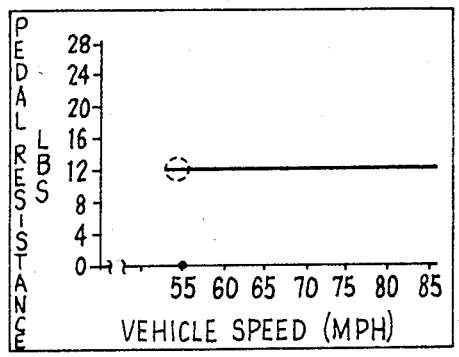

FIG. 4

The Present Invention:
Force Used to Maintain
Accelerator Pedal Position Control
At 55 mph

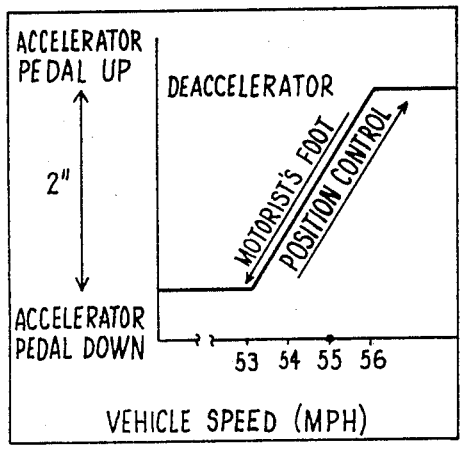
The Present Invention:
Accelerator Pedal Position Control
Operation from 53 to 56 mph
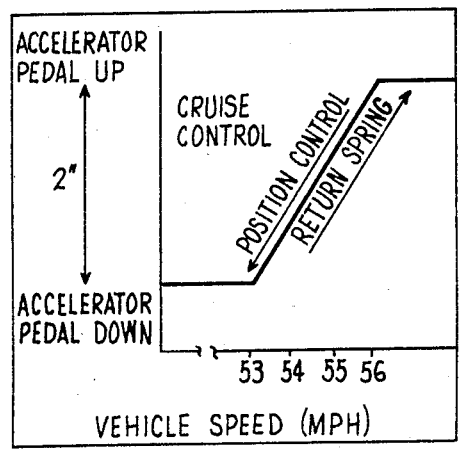
Conventional Cruise Control:
Accelerator Pedal Position Control
Operation from 53 to 56 mph
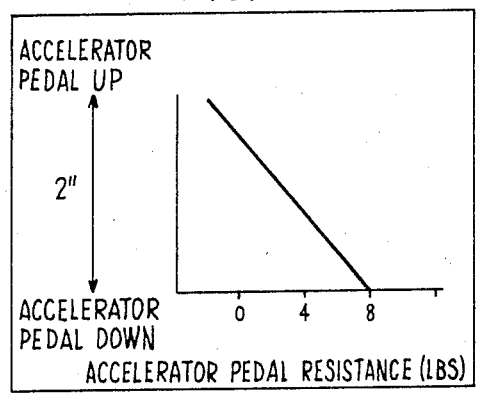
Increasing and Decreasing
Imposed Accelerator Pedal Resistance
as a Function of Increases and Decreases
in Accelerator Pedal Depression
Once a Specified Velocity Has Been Exceeded

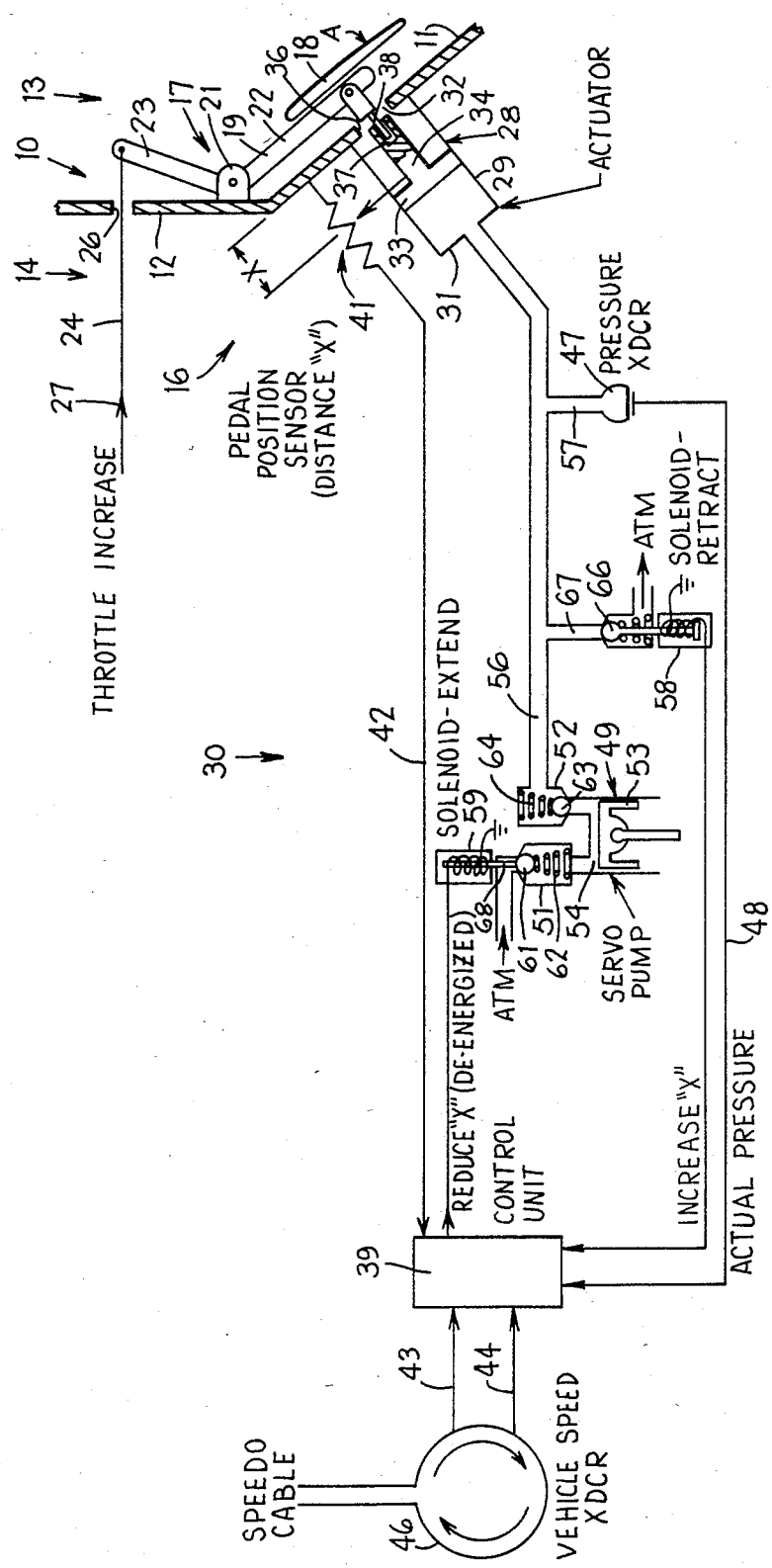

VEHICLE SPEED CONTROL

FIELD OF THE INVENTION

This invention relates to a device for maintaining the rotative speed of a rotatable member at a selected value and, more particularly, relates to a speed control device for a vehicle powered by an engine in which fuel supplied thereto is controlled by the operator depressing and releasing a foot pedal member but that the speed of the vehicle can be maintained at a selected value through the application of a steady force to the foot pedal member.

BACKGROUND OF THE INVENTION

The standard cruise control is a device that allows the motorist to maintain a constant preselected vehicle speed without being required to depress the accelerator pedal. By automatically depressing the accelerator pedal to maintain a preselected velocity, cruise control eliminates the leg fatigue that can accompany sustained highway travel. This leg fatigue usually centers around the ankle and is the result of the varying amounts of accelerator pedal depression required of the motorist to maintain a fairly constant vehicle speed.

There are some motorists who, while appreciating the speed control capability of cruise control, do not appreciate the means by which speed control is obtained. These motorists feel uncomfortable with a device that can pull the accelerator pedal into a depressed position. This discomfort is exacerbated by the lack of contact between the driver's foot and the accelerator pedal that is generally required for smooth and precise operation of cruise control.

Another unattractive feature of cruise control use concerns a potential reduction in highway safety. When not using cruise control, most motorists are accustomed to the often-rehearsed lateral movement of the foot (or leg) when going from the accelerator pedal to the brake. An increase in reaction time regarding the execution of a braking response may occur when a motorist is using cruise control because: (1) the typical lateral response is no longer effective and (2) placement of the motorist's foot varies and must be determined each time a braking response is to be executed. This latency in the braking response is potentially dangerous.

Still another feature of cruise control that incurs disfavor with some motorists is that its disengagement always requires a braking response or a button-pressing response. And engagement or re-engagement of cruise control always requires a button-pressing response. In heavy traffic, execution of these behavioral requirements is not only tedious but can prove potentially dangerous as well if the motorist delays disengaging the cruise control until absolutely necessary in the hope of avoiding the inconvenience entailed in temporarily reducing speed.

DESCRIPTION AND BEHAVIOR ANALYSIS of Pat. No. 4 270 501

In order to solve the highway speeding problem, a previous speed control invention, with a fixed speed setting (Pat. No. 4 270 501), was designed to achieve the following: (1) elimination of the relatively weak but frequent and prolonged behavior (accelerator pedal depression) entailed in unnecessary highway speeding (speeding in which the consequence is a relative reduction in the time to arrival) and (2) preservation of the relatively strong but infrequent and ephemeral behavior (accelerator pedal depression) entailed in necessary highway speeding (speeding in which the consequence is avoidance of an accident).

The previous invention (Pat. No. 4 270 501) utilizes the systematic application of two behavioral principles to achieve speed control. These principles are punishment and reinforcement. Punishment functions to decrease the future probability of the behavior producing it, whereas reinforcement functions to increase the future probability of the behavior producing it.

It has been experimentally shown that sufficiently increasing the force required to operate a manipulandum functions as punishment in that the reinforced behavior producing the increased force requirement will decrease in its future probability. Assuming a substantial force requirement has been imposed, it has also been experimentally shown that decreasing the imposed force required to operate a manipulandum functions as reinforcement in that the behavior producing the decreased force will increase in its future probability. Thus, increased force functions as punishment and decreased force functions as reinforcement.

The previous invention (Pat. No. 4 270 501) eliminates the relatively weak behavior (accelerator pedal depression) involved in unnecessary highway speeding while preserving the relatively strong behavior (accelerator pedal depression) involved in necessary highway speeding through systematic manipulation of the accelerator pedal. Specifically, once the motorist exceeds a fixed velocity, increasing accelerator pedal resistance is a function of increasing vehicle speed. Once imposed, decreasing accelerator pedal resistance is a function of decreasing vehicle speed, with imposed accelerator pedal resistance terminating at the fixed velocity. As punishment, increasing accelerator pedal resistance will decrease the future probability of behavior producing the onset of and increases in unlawful highway vehicle speed. Once unlawful speeding has commenced, the reinforcement provided by decreasing accelerator pedal resistance will increase the future probability of behavior producing decreases in unlawful highway vehicle speed. The purpose of an increasing and decreasing range of accelerator pedal resistance values as opposed to a high single value of accelerator pedal resistance is to minimize potential problems with adaptation—the gradual strengthening of the leg and foot muscles due to prolonged exposure to increased force. By using a single value of imposed accelerator pedal resistance, it is possible for a motorist to accelerate to speeds well in excess of the fixed speed that is correlated with reinforcement (decreased accelerator pedal resistance). To illustrate, and as shown in FIG. 1, if the fixed velocity is 55 mph and a motorist is traveling at 70 mph, then only a decrease in speed to 55 mph will produce reinforcement (decreased pedal resistance). There is no reinforcement available to the speeding motorist who decreases speed to a velocity that is still in excess of 55 mph. Under these conditions, it might be expected that a determined motorist would accelerate to a fairly high unlawful speed (once speeding begins, further increases in speed are not differentially punished) and maintain that speed as long as possible before returning to 55 mph. With considerable practice sustaining a constant force, a motorist might find it easier to spend longer time periods traveling at unlawful highway speeds because of a gradual strengthening of the muscles (adaptation) involved in the execution of accelerator depression. Problems with adaptation can be rendered less likely if a system is designed to minimize the period of time that a speeding motorist spends at any increased value of accelerator pedal resistance. By using an increasing and decreasing range of accelerator pedal resistance values, the speeding motorist's behavior is brought under differential control. To illustrate, and as shown in FIG. 2, if a motorist is traveling at 70 mph and decreases vehicle speed to 65 mph, behavior producing the decrease in speed is differentially reinforced by decreasing accelerator pedal resistance. In fact, any decrease in unlawful vehicle speed will be reinforced since such a decrease is correlated with decreasing accelerator pedal resistance. This kind of differential procedure produces a smoother continual decline in unlawful vehicle speed that renders adaptation to increasing values of accelerator pedal resistance unlikely.

In FIG. 3, the specific function relating increasing and decreasing accelerator pedal resistance to increasing and decreasing vehicle speed is negatively accelerated. This kind of function, as opposed to the linear function shown in FIG. 2, seems best suited to this particular application because the rate of decrease in accelerator pedal resistance (the magnitude of reinforcement) increases as unlawful speed decreases. Increasing the magnitude of reinforcement as vehicle speed decreases toward marginally unlawful speeds is desirable because the aversive stimulation (a motivational variable) is less at marginally unlawful speeds than substantially unlawful speeds. In other words, the way to compensate for the fact that decreases in higher accelerator pedal resistance values are more reinforcing than comparable decreases in lower values of imposed accelerator pedal resistance is to increase the rate of decrease (magnitude of reinforcement) in lower values of imposed accelerator pedal resistance. A negatively accelerated function satisfies these contingencies.

Thus, the device of U.S. Pat. No. 4 270 501 did achieve the basic goal of discouraging the driver from speeding by requiring increasing pedal force as the vehicle exceeded the speed limit. However, the device did not address the critical problem of what happens when the driver travels at the 55 mph speed limit. There was an assumption that the driver could easily and conveniently sense the point at which the force increased, and use this point to raise and lower the pedal as required to maintain a constant speed. Experience and theory has shown this assumption to be invalid.

Accordingly, it is an object of the present invention to provide a speed control system utilizing driver participation (accelerator pedal depression) and at the same time eliminating the ankle fatigue that can accompany sustained highway travel.

A further object of the present invention is to provide a speed control system, as aforesaid, to preserve the same response requirements as those entailed in operating a motor vehicle without a speed control device.

A further object of the present invention is to provide a speed control system to render its operation convenient in heavy as well as light traffic.

It is a further object of this invention to provide a device for maintaining the speed of rotation of a rotatable member at a selected value while simultaneously employing the subject matter disclosed in the aforementioned U.S. Pat. No. 4 270 501, namely, increasing the resistance to foot pedal depression as the vehicle speed increases above a preselected value and decreasing the resistance to foot pedal depression as the vehicle speed decreases toward the aforementioned preset value.

It is a further object of this invention to provide a single housing structure, small in size, to house the various elements for effecting both the increase and decrease in resistance to foot pedal depression and effecting a maintaining of the speed of a rotatable member at a value selected by the operator.

A further object of the invention is to provide a speed maintaining device and an operator constraining device, as aforesaid, in the aforesaid compact housing structure, the components of which housed therein being of durable construction and easy maintenance.

A further object of the invention is to provide a compact housing arrangement, as aforesaid, which is capable of easy in-the-field installation on a vehicle in a location closely adjacent the accelerator pedal to thereby occupy a minimum of space as required in vehicle constructions today.

SUMMARY OF THE INVENTION

The objects and purposes of the invention are met by providing a position control device for use in association with a foot pedal member controlling the fuel flow to an engine of an automobile. The device includes an elongated and hollow chamber means and an actuator piston slidably disposed in the chamber means and movable between first and second positions therein. Structure separately supporting the foot pedal member is provided for movement between first and second positions but permitting an operative connection of the foot pedal member to the actuator piston for movement along a common path. A control device is provided for controlling the position of the actuator piston between the first and second positions and in response to vehicle speed and includes a yieldable resistance device for causing the actuator piston to resist a change in the position of the foot pedal member if an effort is made to alter the position of the foot pedal member beyond the position of the actuator piston determined by the control means while simultaneously permitting an overpowering of the yieldable resistance device to effect a yieldable movement of the foot pedal member and the actuator piston together along the common path to vary the fuel supply to the engine.

The objects and purposes of the invention are further met by providing the aforementioned invention, both apparatus and the method use thereof, in an automobile environment wherein the speed of the automobile is maintained at a selected value.

The objects and purposes of the invention are further met by providing a speed control device for a vehicle which is equipped with structure for increasing and decreasing the resistance to accelerator pedal depression in response to the speed of the vehicle above a preselected value set by the operator.

BRIEF DESCRIPTION OF THE DRAWINGS

Other objects and purposes of this invention will be apparent to persons acquainted with apparatus of this general type upon reading the following specification and inspecting the accompanying drawings, in which:

FIGS. 1 to 4 are various representative graphs illustrating the functional characteristics of various types of controls;

FIG. 5 is a graph illustrating a functional characteristic of the inventive device;

FIG. 6 is a graph illustrating a functional characteristic of a conventional cruise control device;

FIG. 7 is a graph illustrating a functional characteristic of the inventive device;

FIG. 8 is a schematic illustration of the inventive device embodying the invention;

DETAILED DESCRIPTION

Figure 9:
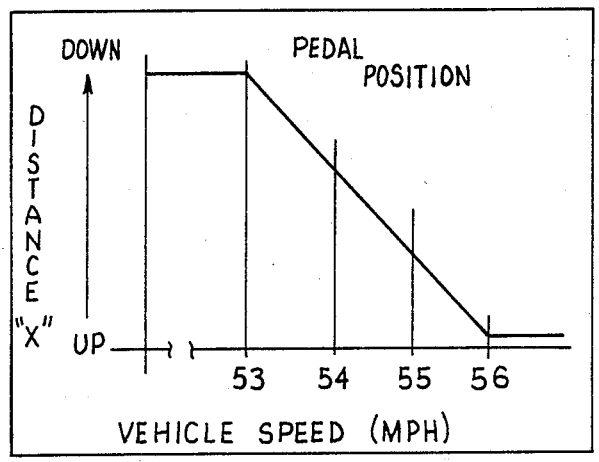
FIGS. 9 to 12 are various representative graphs illustrating the functional characteristics of structure embodied within the inventive device.

The present invention maintains a preselected vehicle speed by limiting the motorist's degree of accelerator pedal depression to the position required to maintain the preselected vehicle speed. The motorist can depress the accelerator pedal beyond the position that maintains the preselected speed by overriding the force utilized to maintain pedal position control (for example, 12 pounds, as depicted in FIG. 4). Pedal position control and thus the preselected velocity will be maintained if the motorist exerts any force less than the force utilized to maintain pedal position control but more than the force provided by the return spring. (Actually, if the 4 pound force generated by the average return spring (not shown) of the accelerator pedal is added to the 12 pound force (in the above example) used for position control, a total greater than 16 pounds is required of the motorist to depress the accelerator pedal beyond the controlled position.) When the motorist is traveling at speeds below the preselected speed, the accelerator pedal functions in the usual manner by providing a back force of approximately 4 pounds via the return spring.

FIGS. 5 and 6 show how the application of position control technology to the present invention differs from its application to cruise control. The operational range of the position control system shown in FIG. 5 is represented in the circled area of FIG. 4, beginning with the accelerator pedal fully depressed at 53 mph and extending in a linear fashion with increasing speed until reaching a fully extended position at 56 mph. The present invention operates to move the accelerator pedal toward an extended position when vehicle speed exceeds the preselected speed, whereas cruise control allows the normal return spring to move the accelerator pedal toward an extended position when vehicle speed exceeds the preselected speed. And the present invention allows the motorist's foot to move the accelerator pedal toward a depressed position when vehicle speed falls below the preselected speed, whereas cruise control moves the accelerator pedal toward a depressed position when vehicle speed falls below the preselected speed. It is evident that while both the present invention and cruise control allow the motorist to travel at a constant speed, the means by which speed control is obtained require a different application of the technology involving control of accelerator pedal position.

The present invention, like cruise control, can eliminate the ankle fatigue often accompanying sustained travel. When operating a motor vehicle not equipped with a speed control device, motorists generally rest the heel of the foot on the floor while the rest of the foot is in full contact with the accelerator pedal. Varying amounts of accelerator pedal depression are required of the motorist to maintain a constant speed when encountering varying road gradients and changing wind conditions. The motorist varies accelerator pedal depression by foot movements pivotal at the ankle. With the present invention, the heel of the motorist's foot need not rest on the floor during accelerator pedal operation. Instead, the motorist now has the option of placing the foot, including the heel, on the accelerator pedal so that the accelerator pedal literally functions to support the foot. If a motorist attempted this in a vehicle not equipped with this invention, the weight of the foot would provide a force greater than the counterforce provided by the 4 pound return spring of the accelerator pedal. The accelerator pedal would become almost completely depressed, and the speed of the vehicle would become far too great. If a motorist's foot is placed on the accelerator pedal of a vehicle equipped with the present invention, the weight of the motorist's foot will depress the accelerator pedal only far enough to maintain the selected velocity. As the vehicle moves uphill, the weight of the motorist's foot will further depress the accelerator pedal to the new position required to maintain the selected velocity. As the vehicle moves downhill, the accelerator pedal will automatically move the motorist's foot toward an extended position to maintain the selected velocity. Thus, this invention, like cruise control, eliminates ankle fatigue by automatically maintaining a preselected velocity; however, this invention, unlike cruise control, achieves speed control in conjunction with driver participation.

As already noted, various behavioral requirements can render operation of cruise control tedious in heavy traffic when vehicle speed must be frequently reduced. The present invention is designed to minimize the behavioral responses required for its operation in heavy traffic. When a reduction in vehicle speed below the controlled speed becomes necessary, the motorist simply reduces the amount of accelerator pedal depression (unless an abrupt reduction is required, in which case the brake would obviously be applied). When desiring to resume traveling at the controlled speed, the motorist depresses the accelerator pedal until the preselected velocity is obtained, at which point the accelerator pedal will once again position itself (and the motorist's foot) so as to maintain that velocity. Thus, unlike cruise control, the present invention may be operated in heavy traffic without proving tedious for the motorist. In fact, once a preselected velocity has been chosen, the responses required to operate the present invention in heavy traffic (or any traffic, for that matter) are exactly the same as those required in normal vehicle operation. The only response requirement entailed in operating the present invention is choosing the velocity at which one wishes to travel.

The present invention may be combined with the previous invention (Pat. No. 4 270 501) to produce an improved speed control system. That is, the device of Pat. No. 4 270 501 has only one function, namely, controlling the force required to depress the pedal. This combination is inventively accomplished by replacing the steep initial slope of imposed accelerator pedal resistance values between 55 and 56 mph shown in FIG. 3 with the position control system shown in FIGS. 4 and 5 to produce the improved speed control system shown in FIG. 10. The reason for this change is that smoother operation at the preset speed can be obtained by position and force control as opposed to using force control only.

The improved speed control system will function as follows. At 55 mph, the accelerator pedal will resist further depression by positioning itself and the motorist's foot so as to maintain 55 mph. (Position control actually operates across a narrow speed range in which the accelerator pedal may be fully depressed at 53 mph and is fully extended at 56 mph if the travel speed is set for 55 mph.) The position control may be overridden if the motorist depresses the accelerator pedal with a force greater than the 12 pound constant utilized to maintain the position control. When the position control is overridden, the vehicle will accelerate in speed. When this occurs, position ceases to be a factor as increasing accelerator pedal resistance is imposed as a function of increases in vehicle speed. Once accelerator pedal resistance has been imposed, decreasing accelerator pedal resistance is a function of decreasing vehicle speed. Only when vehicle speed has been reduced below 56 mph (but remains above 53 mph) will position control resume operation.

Another improvement over Pat. No. 4 270 501 is the addition of increments and decrements in imposed accelerator pedal resistance as a function of increments and decrements in accelerator pedal depression once a specified velocity is exceeded. (See FIG. 7 for example.) Accelerator pedal resistance occurring as a function of accelerator pedal depression once a specified velocity is exceeded is to be superimposed on the increasing and decreasing range of accelerator pedal resistance that occurs as a function of increases and decreases in unlawful speed as described in Pat. No. 4 270 501. The purpose of the additional acceleratorpedal-depression-based accelerator pedal resistance concerns a potential problem already discussed—adaptation on the part of the motorist to imposed accelerator pedal resistance.

Under certain conditions a motorist may change the degree of accelerator pedal depression without generating a corresponding change in vehicle speed. For example, this situation may occur when a motorist encounters varying road gradients after establishing vehicle speed on a horizontal road. The changes in momentum that result when a motorist encounters changes in road gradients can counterbalance the effects of changed engine output that accompanies changes in accelerator pedal depression. Another situation in which accelerator pedal depression can be changed without changing the established speed involves changing wind conditions. Variations in head winds and tail winds can result in the maintenance of the established speed despite changes in accelerator pedal depression.

The importance of a differential system of accelerator pedal control has been discussed above as a safeguard in reducing the likelihood of adaptation to imposed accelerator pedal resistance. It was noted that an advantage of the differential system is that behavior producing any increase or decrease in unlawful highway vehicle speed generated, respectively, punishment (increased accelerator pedal resistance) and reinforcement (decreased accelerator pedal resistance).

Behavior producing increases and decreases in accelerator pedal depression is, of course, critical in effecting corresponding increases and decreases in unlawful highway vehicle speed (or any vehicle speed). In fact, changes in accelerator pedal depression once unlawful speeding begins are so important that each change should alter imposed accelerator pedal resistance even if vehicle speed has not been altered. This is because behavior that generates changes in accelerator pedal depression is at the very least precursory to behavior that will effect changes in unlawful highway vehicle speed.

Imposing a supplementary source of punishment (increases in accelerator pedal resistance) as a function of behavior producing increases in accelerator pedal depression once highway speeding begins will render less likely behavior effecting increases in unlawful highway vehicle speed. And providing a supplementary source of reinforcement (decreases in accelerator pedal resistance) as a function of decreases in accelerator pedal depression will render more likely behavior effecting decreases in unlawful highway vehicle speed. Thus, the range of increases and decreases in accelerator pedal resistance occurring as a function of respective increases and decreases in unlawful highway vehicle speed is to be concurrently supplemented by a range of increasing and decreasing accelerator pedal resistance imposed as a function of respective increases and decreases in accelerator pedal depression.

It should be noted that the values of imposed accelerator pedal resistance occurring as a function of unlawful highway speed are substantially greater than the values of imposed accelerator pedal resistance occurring as a function of accelerator pedal depression once unlawful highway speed begins. The correlation between increasing and decreasing accelerator pedal resistance and increases and decreases in unlawful highway speed might under some conditions prompt the motorist to gauge current unlawful highway vehicle speed according to the value of accelerator pedal resistance currently imposed. Stated differently, imposed accelerator pedal resistance occurring as a function of unlawful highway speed may occasionally be utilized by the motorist much like a speedometer—to quickly determine the approximate vehicle speed. Subsequent driving behavior (such as when to cut back in after passing a vehicle on a hill) may be partially controlled by the speed-based accelerator pedal resistance urging against the motorist's foot. Any stimulus that can even briefly exert control in the fashion of a speedometer must reflect vehicle speed as accurately as possible. A stimulus such as accelerator pedal resistance as a function of accelerator pedal depression once highway speeding begins is only loosely correlated with increases and decreases in unlawful highway speed and thus would not be a reliable indicator of unlawful highway speed. By using relatively high values of speed-based accelerator pedal resistance and relatively low values of accelerator-pedal-depression-based accelerator pedal resistance, the saliency of the former will render speedometer control by the latter unlikely.

Thus, and relating the foregoing discussion to the conventional cruise control, an actuator in the conventional cruise control pulls directly on the throttle lever through a separate cable. This actuator need only act in one direction, since there is a return spring which returns the throttle to idle. If the driver wishes to travel faster, he can push the pedal down further, which simply puts slack in the cable. He cannot let up on the throttle, however, without disengaging the cruise control.

In the inventive device, the driver must push down on the pedal for it to move at all; but if he tries to exceed the pedal position which will just maintain the desired set speed, then the actuator pushes back on the driver's foot. The manner in which this is accomplished will be explained in further detail below.

FIG. 8 illustrates in schematic form the general concept of the invention as it is applied to a powered vehicle, such as an automobile 10. The automobile has a floorboard 11 extending generally at an angle to join with a fire wall 12 extending vertically between a passenger compartment 13 and an engine compartment 14. A throttle control 16 operates to control the movement of a fuel control linkage 17 having a foot pedal member such as the accelerator pedal 18 pivotally mounted on a lever arm 19 which is pivotally mounted on a bracket 21 fastened to the fire wall 12. The lever arm 19 is, in this embodiment, a two-arm lever, the arm 22 having the accelerator pedal 18 mounted thereon and the arm 23 having a cable 24 fastened thereto, which cable extends through an opening 26 in the fire wall 12 and is connected to the throttle linkage on the internal combustion engine for the vehicle, not illustrated. A pulling on the cable in the direction of the arrow 27 will generally cause more fuel to be used by the engine of the automobile 10 to increase the velocity of the automobile when it is in gear and being driven on a roadway. A movement of the cable 24 in the opposite direction will generally cause less fuel to be used by the engine to cause a decrease in the velocity of the automobile. If desired, a not illustrated spring can be provided to pull the cable 24 leftwardly to continually urge the accelerator pedal 18 to its most raised position thereby providing the engine with a minimum of fuel so that the carburetor setting for the automobile will maintain the engine in an idle operation.

The aforementioned throttle control structure for the internal combustion engine is conventional and does not form a part of the invention.

A pedal movement resisting device 30 includes a piston-cylinder assembly 28, is provided for controlling the resistance to depression of the accelerator pedal 18 in direction A. This assembly 28 includes a cylinder 29 having a closed end 31 and an open end 32. An actuator piston 33 is slidably mounted in the cylinder 33 and has a piston rod 34 fastened thereto on a side of the piston 33 remote from the closed end 31 and projecting through an opening 36 in the floorboard 11. In this particular embodiment, the piston rod 34 has a recess 37 in the free end thereof. A linkage arm 38 is, in this particular embodiment, pivotally secured to the arm 22 of the lever 19 and projects through the opening 36 in the floorboard 11 and is received in the recess 37 in the free end of the piston rod 34. It will be noted that if the accelerator pedal 18 is moved in the direction of the arrow A, the linkage arm 38 will bottom out in the recess 37 to urge the piston 33 toward the closed end 31 against whatever pressure force may be present in the cylinder 29 resisting such movement.

Figure 10:
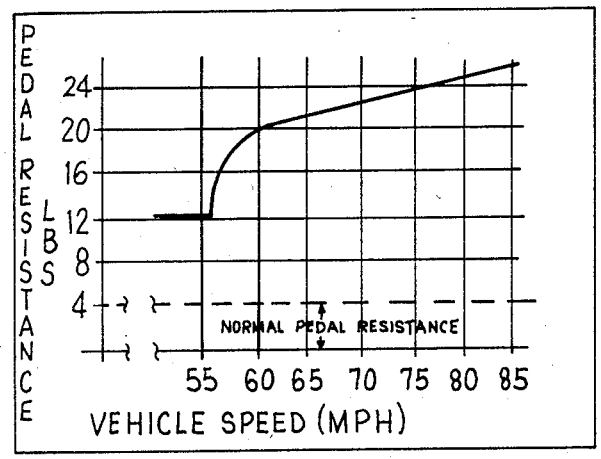
Figure 13:
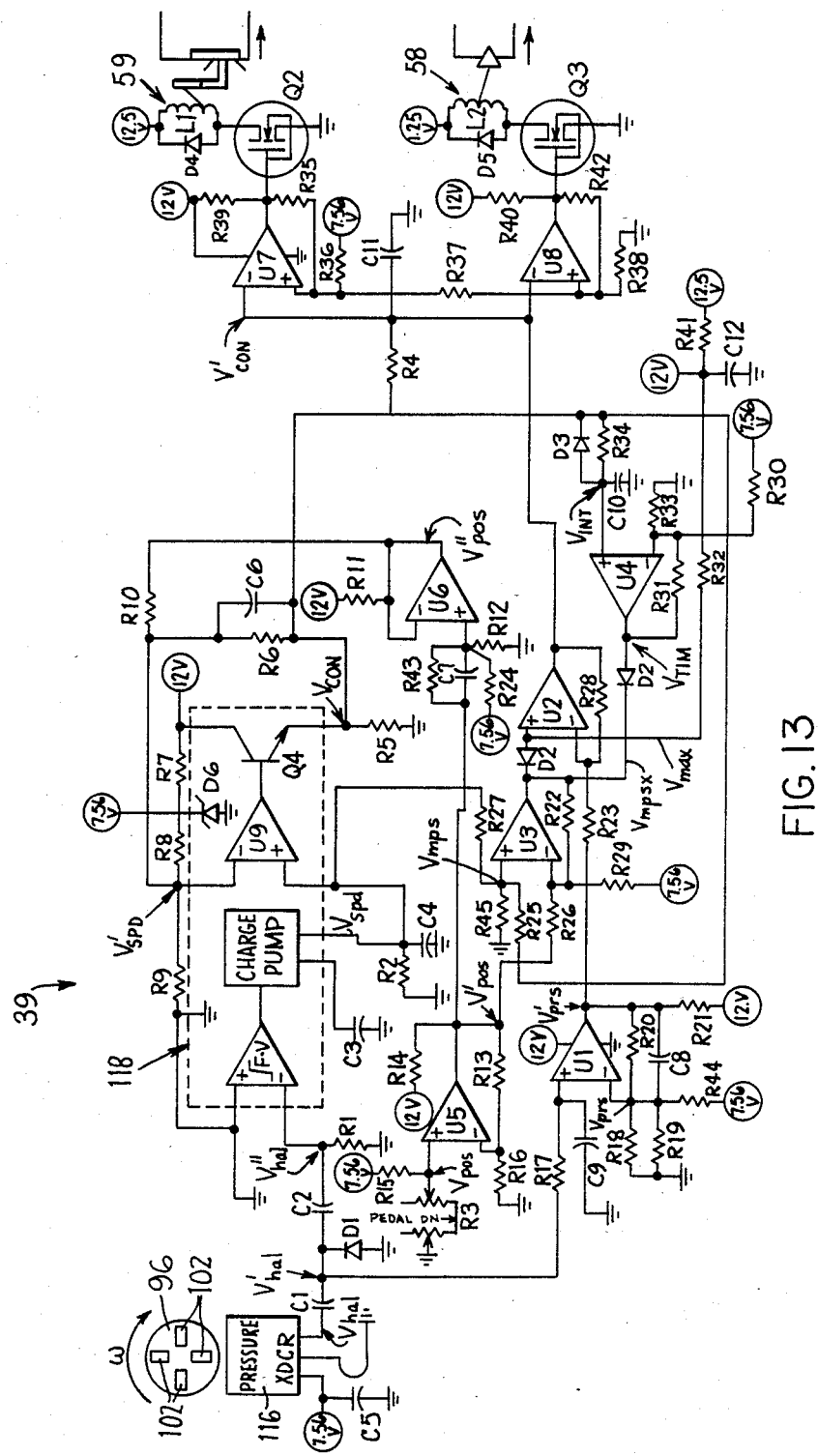
FIG. 13 is an electrical schematic diagram.

The pedal movement resisting device also includes a control unit 39 (the specific subject matter of which is illustrated in FIG. 13), which is housed in a moisture resistant housing structure, not illustrated. The control unit 39 is responsive to electrical signals which will be described in detail below. One of the electrical signals is generated by a pedal position sensor 41 which supplies an electrical signal through a connecting line 42 to indicate the actual position of the piston 33 in the cylinder 29. A further signal is provided through lines 43 and 44 to the control unit 39 and indicate the actual speed of the vehicle through a vehicle speed transducer 46. A pressure transducer 47 is provided for generating an electrical signal transmitted through connecting line 48 to the control unit 39 to indicate the actual pressure generated by a servo pump 49. In this particular embodiment, the servo pump 49 is driven by the rotating speedometer cable through a connection schematically illustrated in FIG. 8 but described in more detail in relation to FIGS. 15 to 20. The servo pump 49 has a pair of check valves 51 and 52, the check valve 51 closing on a compression stroke of the piston 53 while the check valve 52 becomes opened. Similarly, on the downstroke of the piston 53, the check valve 52 becomes closed and the check valve 51 becomes open to facilitate the entry of air into the compression chamber 54. Pressurized air from the servo pump 49 is transmitted through a conduit 56 to the closed end 31 of the cylinder 29. The pressure transducer 47 communicates with the conduit 56 through a conduit 57 to provide a feedback signal through the electrical connecting line 48 to the control unit 39 thereby indicating the actual pressure in the conduit 56 generated by the servo pump 49. In order to effect an acceleration of the vehicle, the operator must depress the foot pedal 18 in the direction of the arrow A. Additional fuel will be supplied to the engine to accelerate the vehicle. As shown in the graph of FIG. 10, the operator must initially overcome a 4-pound force pushing up on the accelerator pedal 18 in a direction opposite to the arrow A. The normal resistance to pedal depression is generally around 4 pounds and is caused by various springs acting on the throttle linkage system. Normal operation of the accelerator occurs at speeds below 53 miles per hour.

As the vehicle speed approaches 53 miles per hour, the pressure forces acting on the piston 33 in the cylinder 39 will suddenly be adjusted to cause the piston to move upwardly in the cylinder in a direction opposite the arrow A so that the piston will become oriented in the proper location as determined by the pedal position indicator 41 and in accordance with the indicated speed of the vehicle. If the operator continues to depress the accelerator pedal in a manner to cause the vehicle to exceed the 53 mph speed limit, it must be done by a force in excess of 12 pounds (see FIG. 10). The pedal movement resisting device 30 which includes the servo pump 49 and related circuitry in the control circuit 39 will control a pair of solenoid valves 58 and 59 to accurately control the pressure of the compressed air in the conduit 56. As illustrated in FIG. 10, the force required by the operator to exceed the 55 mph speed limit will instantly jump upwardly which the vehicle operator will immediately take note of by reason of the extra effort required to depress the accelerator pedal. However, the vehicle operator may continue to override the system by providing a greater force on the accelerator pedal to enable the vehicle to accelerate to speeds in excess of 55 mph. The vehicle operator will also take note of the fact that greater and greater forces will be applied to the accelerator pedal 18 in a direction opposite the arrow A as the vehicle speed continues to increase. Assuming the vehicle operator desires to operate the vehicle at about 55 mph, the vehicle operator must then control the accelerator pedal by applying a force thereto in the direction of the arrow A. That is, the force applied to the accelerator pedal in the direction of the arrow A and the position of the accelerator pedal, or at least the position of the piston 33, are controlled by the control circuit 39 so that the piston 33 can only raise the pedal by pushing up on the driver's foot through a lost-motion link represented by the linkage arm 38. In order for the position action for the accelerator pedal to be realized, the driver must push down on the pedal 18 at least hard enough so that the piston rod 34 is contacted. Thus, the piston rod 34 will push back to raise the pedal and give way to a depression of the pedal. The pedal force applied by the operator must always exceed the reverse force applied to the piston 33. In this case, and as illustrated in FIG. 10, the reverse force is assumed to be approximately 12 pounds if the vehicle operator desires to operate the vehicle under the speed limit of 56 mph and above 53 mph. If the vehicle speed should accelerate due to the vehicle moving, for example, down a hill, it will be necessary, in order to maintain the speed of the vehicle as close as possible to the 55 mph speed limit, to reduce the distance "X" indicated by the pedal position sensor 41. This is accomplished without the operator varying the force applied to the accelerator pedal by holding the solenoid 59 deenergized so that the servo pump 49 will supply pressurized air to the conduit 56 to push out on the piston 33 to thereby raise the accelerator pedal 18 in a direction opposite the arrow A. The reason for this is that the ball check member 61 in the check valve 51 will be urged by the spring 62 into engagement with the ball seat normally provided for the check ball 61. Thus, on suction strokes of the piston 53, air will be drawn past the ball 61. On pressure strokes of the servo pump 49, the ball check member 61 will close and the ball check member 63 of the check valve 52 will open against the urging of the spring 64 to supply pressurized air to the conduit 56. The increase in pressure will also be detected by the pressure transducer 47 which will transmit an appropriate electrical signal at 48 to the control unit 39. If, for example, the vehicle encounters a hill and it is desired to travel up the hill without losing speed, it will be necessary for the operator to continue to hold a generally steady foot force on the accelerator pedal and without experiencing any greater than normal return force (i.e. the 12-pound force mentioned above). This can be accomplished by energizing the solenoid 58 to retract the ball-like check member 66 away from the seat normally provided therefor so that pressurized air can be bled from the conduit 56 through the conduit 67 to the atmosphere. If, of course, the vehicle speed exceeds the 55 mph limit, the solenoid 58 will immediately become closed so that the pressure in the conduit 56 can be activated to instantly inform the operator that the vehicle speed has attained the desired speed limit value of 55 mph through the sensation felt through the foot. It will, of course, be recognized that if the solenoid 59 is energized, the armature 68 thereof will hold the ball check member 61 away from the seat provided therefor to prevent any compression from being developed within the chamber 54. In other words, the servo pump will be instantly deactivated. However, the pressure in the conduit 56 will remain due to a closing of the ball check members 63 and 66. Thus, on a normal roadway extending generally horizontally, the servo pump can continue to function but will be rendered inactive due to an opening of the ball check member 61 by activation of the solenoid 59.

During the course of the above set forth operative sequence, it will be immediately recognized that if the operator removes the foot from engagement with the accelerator pedal 18, the vehicle will immediately respond thereto by effecting a decrease in the supply of fuel to the engine and if conditions are appropriate, the vehicle would begin to slow down. Further, the characteristic of FIG. 10 will be realized if an attempt is made to violate the characteristic of FIG. 9.

Figure 15:
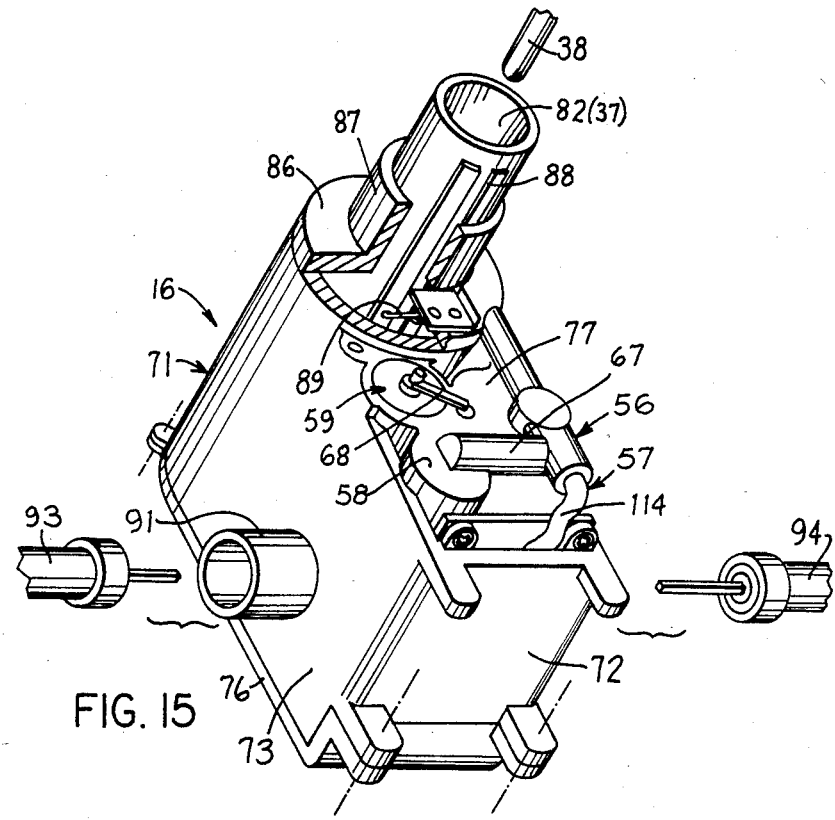
FIG. 15 is a perspective view of a compact housing structure embodying the invention.

FIGS. 15 to 20 illustrate a compact housing structure which is to be mounted in the general location indicated by the location of the piston-cylinder assembly 28 in FIG. 8. That is, it is to be mounted on the floorboard 11 and project away therefrom on a side of the floorboard 11 remote from the accelerator pedal 18. The housing 71 has plural side walls 72, 73, 74 and 75 and a pair of end walls 76 and 77. The housing 71 is divided into two compartments, namely, a pumping chamber 78 corresponding to the cylinder 29 set forth above in regard to FIG. 8 and pressure transducer chamber 97 described in more detail below. The pumping chamber 78 has slidably disposed therein a piston member 79, which piston member has a piston rod 81 secured thereto. The piston 79 and the piston rod 81 correspond, of course, to the piston 33 and piston rod 34 mentioned above in regard to FIG. 8. The piston rod 81 has a recess 82 in the free end 83 thereof. The piston rod 81 projects through an opening 84 provided in the end wall 86 of the chamber 78 remote from the end wall 76. In this particular embodiment, the opening 84 is defined by a sleevelike projection 87 extending outwardly from the end wall 86. The piston rod 81 has mounted on a side thereof an elongated strip of conductive material 88 on which slidably rides a pair of electrical contacts 89. Only one such electrical contact 89 is shown in FIG. 15. It is to be understood that the electrically conductive material 88 is generally U-shaped with each contact 89 slidably engaging a leg of the U-shaped electrically conductive material 88. One contact 89 is connected to ground and the other contact is connected to the control circuit 39 through the conductor 42 (FIG. 8). The circuit 39 will be described in more detail below and in regard to FIG. 13. It can be stated that when the piston rod 81 is fully extended, the contacts 89 will be adjacent each other at the bight portion of the U-shaped conductive material 88 so that virtually no resistance will be presented between the contacts 89. On the other hand, when the piston rod 81 is fully retracted, the contacts will be adjacent the free ends of the legs of the U of the conductive material 88 and a maximum of electrical resistance will be presented between the contacts 89. This arrangement will be utilized to indicate the position of the piston 79 and piston rod 81 relative to the cylindrical chamber 78.

Figure 17:
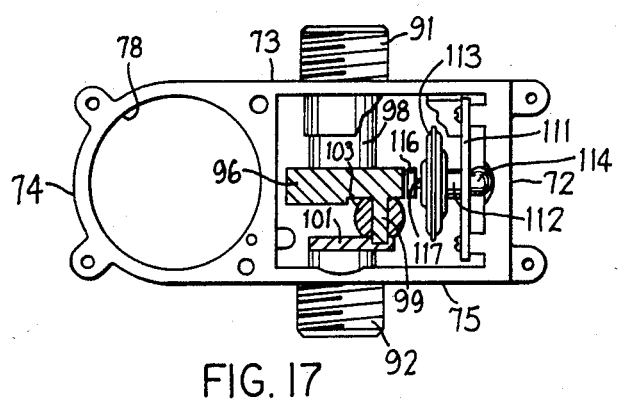
FIG. 17 is a bottom view of the housing with the lid thereof removed to expose components mounted thereon (see also the section line X—X in FIG. 16)
Figure 16:
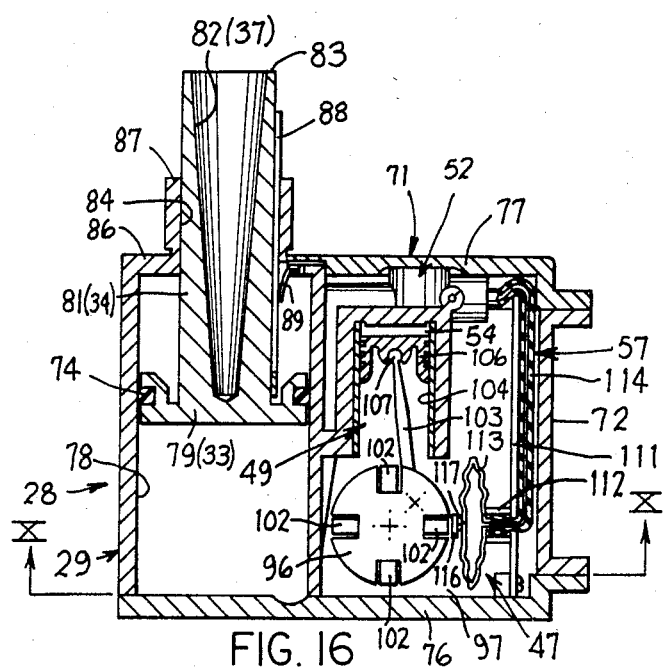
FIG. 16 is a sectional view taken along the line IX—IX of FIG. 18.
Figure 18:
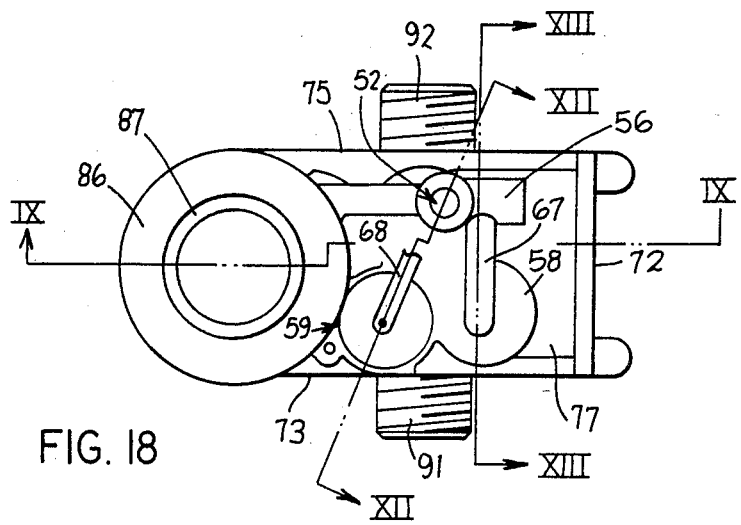
FIG. 18 is a top view of the housing structure.

The side walls 73 and 75 of the housing 71 have axially aligned openings therein, each of which is encircled by an externally threaded coupling 91 and 92. The speedometer cable member 93 from a vehicle driven component of the automobile is connected to the coupling member 91 as schematically illustrated in FIG. 15. The other speedometer cable member 94 is coupled to the other coupling 92 and delivers speed and odometer information to the speedometer and odometer visible to the driver of the vehicle. As illustrated in FIGS. 16 and 17, a disk 96 is rotatably supported in the housing 71 particularly in the chamber 97 immediately adjacent the aforedescribed pumping chamber 78. A bearing member 98 is rotatably mounted in the coupling member 91 and the disk 96 is connected to the rotatable member of the bearing member. The rotatable member in the bearing member is coupled to the driving member in the speedometer cable 93. The disk 96 also has a crank pin 99 thereon which is coupled to a further disk 101 rotatably supported on the rotatable member in the other coupling member 92. Thus, a rotation of the disk 96 will also result in a simultaneous rotation of the disk 101 and thence a driving of the rotatable member in the speedometer cable 94 drivingly coupled thereto. Plural permanent magnet members 102 are fixedly provided around the periphery of the disk 96 as illustrated in FIG. 16.

A crank arm 103 is journaled to the crank pin 99. Since the crank pin 99 is oriented adjacent the periphery of the disk 96, the crank arm 103 will be caused to be moved accordingly therewith. Radially aligned with the disk 96, particularly the crank pin portion 99 thereof is a cylindrical chamber 104 having a piston 106 slidably disposed therein. The free end of the crank arm 104 is connected through a spherical socketlike joint 107 so that upon a rotation of the disk 96, the piston 106 will be driven for reciprocal movement within the cylindrical chamber 104. Thus, the driven member in the speedometer cable 93 will effectively drive the disk 96 for rotation and effect a reciprocation of the piston 103 within the cylindrical chamber 104. This servo pump corresponds to the servo pump 49 described above and has been correspondingly referenced in FIG. 16.

A mounting plate 111 is provided in the chamber 97 and extends generally parallel to but spaced from the side wall 72. A cylindrical sleeve 112 is fastened to the mounting plate 111 on a side thereof remote from the side wall 72. The cylindrical sleeve 112 is radially aligned with the radial plane of the disk 96. An inflatable diaphragm is secured to the cylindrical sleeve 112. The inflatable diaphragm 113 corresponds to the pressure transducer 47 illustrated in FIG. 8. A conduit 113 supplies pressurized air from the servo pump 49 to the inflatable diaphragm 113 and corresponds to the conduit 57 illustrated in FIG. 8. The inflatable diaphragm 113 is oriented between the cylindrical sleeve 112 and the peripheral surface of the disk 96 as illustrated in FIGS. 16 and 17. A 3501T Hall effect transducer 116 is secured to the surface of the inflatable diaphragm 113 on a side thereof remote from the cylindrical sleeve 112. The Hall effect transducer 116 is oriented so that it is closely adjacent the peripheral surface of the disk 96, particularly the permanent magnets 102 provided thereon. Thus, every time one of the magnets embedded in the disk 116 passes by the Hall effect transducer, its output voltage varies in a cyclic manner. The specific function performed by the Hall effect transducer will be described in more detail below in relation to the operation of the circuit illustrated in FIG. 13.

Figure 19:
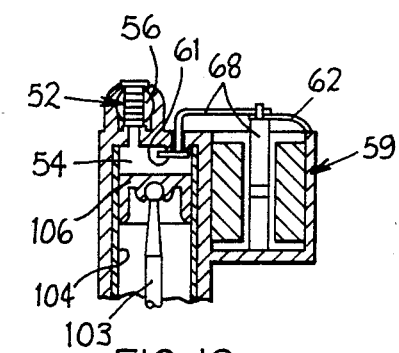
FIG. 19 is a sectional view taken along the line XII—XII of FIG. 18.
Figure 20:
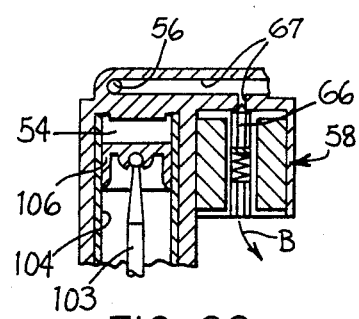
FIG. 20 is a sectional view taken along the line XIII—XIII of FIG. 18.

As illustrated in FIGS. 19 and 20, the electromagnet solenoids 58 and 59 are also provided in the housing 71, particularly in the chamber 97. The check valve arrangement is normally closed as indicated by the valve member 61 resting against the seat provided therefor. The armature 68 is pulled downwardly within the solenoid 59 upon energization thereof against the urging of the spring 62, which in this particular embodiment is a leaf spring instead of the coil spring schematically illustrated in FIG. 8. A check valve 52 controls the flow of pressurized air to the conduit 56. The solenoid valve 58 is normally closed and maintains the pressure within the conduit 56. However, when the solenoid 58 is energized, the armature 66 will be retracted to bleed pressurized air from the conduit 56 out to the atmosphere in direction of the arrow B illustrated in FIG. 20.

CIRCUIT OF FIG. 20

Referring to FIG. 8, the function of the control unit 39 is to control the position and/or operating force of the accelerator pedal. Control of position can be considered the primary function; control of the force is in the form of an override of the position control. That is, the position control will permit whatever force is necessary to be applied to achieve the specified position, up to where the force required exceeds its specified limit.

The force and position are controlled by a pneumatic actuator, i.e. the piston 33 (79) and piston rod 34 (81) that can only raise the pedal, by pushing up on the driver's foot through a lost-motion link to the accelerator pedal 18. This is a primary safety feature. In order for the position action to be realized, the driver must, as stated above, push down on the pedal 18 at least hard enough so that the actuator 33, 34 is contacted. Thus, the actuator 33, 34 will push back at a speed of at least 53 mph to raise the pedal, and give way to depressing the pedal; this situation will always be assumed in what follows unless otherwise stated. The force action of FIG. 10 comes into operation when the driver pushes on the pedal with a force that exceeds the limit as determined by the existing vehicle speed and other factors as depicted by FIG. 9. The actuator 33, 34 then gives way until the force is at or below the limit. This means that the driver's foot force is always equal to or overpowers the position control at speeds of 53 mph or greater.

The position and force are primarily functions of vehicle speed. They are also functions of time. The force is in addition a function of the pedal position.

Position Control

Basically, the position of the pedal is specified by the vehicle speed in such a way as to keep the speed itself as constant as possible. Thus, when the speed is close to but below 53 mph, the pedal 18 should be fully depressed, since the speed is too low. When the speed goes above 53 mph, the pedal is raised linearly with the speed (decreasing the value of dimension "X" in FIG. 8), so that the pedal is fully raised at 56 mph. See FIG. 9, showing pedal position vs. speed. This is essentially the same action the driver takes as he acts to control the speed himself, and is exactly the same principle used by many, but not all, vehicle cruise controls. The details as to how this is accomplished are as follows.

Referring to the circuit diagram of FIG. 13, upper left corner, information as to the vehicle speed is obtained from the rotation of the servo pump flywheel or disk 96, which is driven by the speedometer cable 93 (FIG. 15). Every time one of the magnets 102 embedded in the flywheel 96 passes by the 3501T Hall effect transducer 116, its output voltage, $V_{hal}$, varies in a cyclic manner. This cyclic variation is passed through capacitors C1 and C2, and appears as the voltage $V'''_{hal}$, at the input to the LM2917 frequency-to-voltage (F-V) converter 118. (The intermediate voltage $V'_{hal}$ is used for force control described below.) Voltage $V'''_{hal}$ will cycle symmetrically about ground due to the effect of R1 in conjunction with C2. The Hall device 116 also requires a ground connection and a 7.56 v supply voltage. Capacitor C5 acts to supply the varying current required by the Hall device 116, thus reducing the current variation needed from the 7.56 v source.

Figure 11:
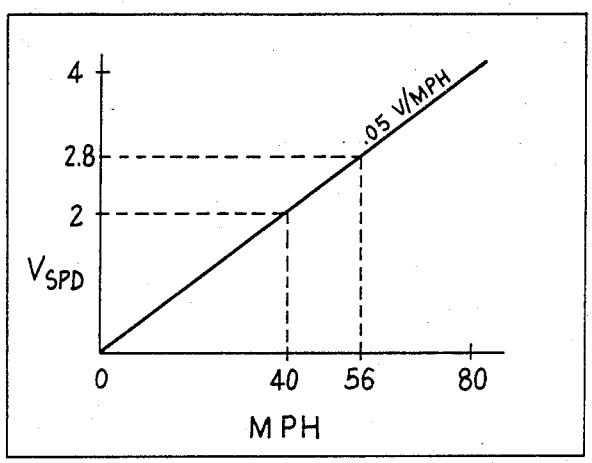

The action of the F-V converter 118 is to convert a frequency into a proportional voltage $V_{spd}$, at the output of the charge pump of the F-V converter. C4 acts to average the current pulses produced by the charge pump and convert them to a voltage. A large value of capacitance for C4 can reduce the residual ripple in the $V_{spd}$ voltage but cannot eliminate it entirely; C4 cannot be too large or $V_{spd}$ will not respond to dynamic variations in vehicle speed fast enough. R2 determines the calibration of this voltage and is such that 0.05 v equals 1 mph, so that 2.8 v is equivalent to 56 mph. See FIG. 11.

$V_{spd}$ is applied to the non-inverting junction of operational amplifier (op amp) U9 in the F-V converter. The voltage on the inverting junction of op amp U9, $V'_{spd}$, is kept at an initial, or nominal, 2.8 v by the action of the 7.56 v reference voltage acting through R8 and R9. (The 7.56 v reference is part of the F-V converter package, and is obtained by use of zener D6 to establish the voltage, and R7 connected to the 12 v filtered battery voltage to supply the current required by the 7.56 v reference.) The actual value of $V'_{spd}$ depends on $V_{con}$, acting through R6 and $V''_{pos}$ acting through R10. $V'_{spd}$ is 2.8 v when $V_{con}$ is zero v and $V''_{pos}$ is 9 v, the nominal values for these quantities.

It will first be shown how $V_{con}$ can be made to vary as a function of $V_{spd}$ in a certain desired manner. This is achieved by the action of op amp U9. (Q4 is simply used to boost the output current capability of U9, and will not be referred to further.)

Figure 12:
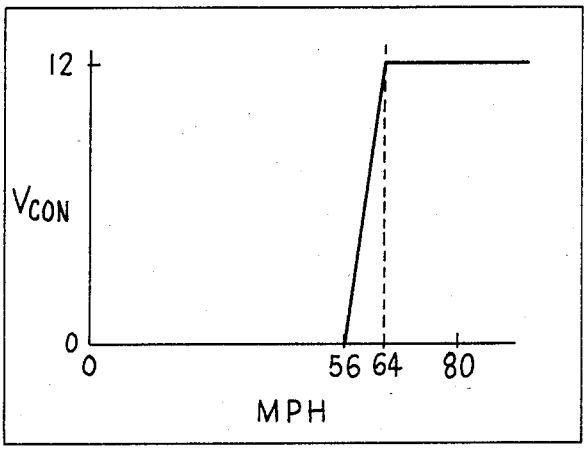

The action of U9 is to make $V_{con}$ vary as a function of $V_{spd}$ by the "feedback" effect of $V_{con}$ acting through R6 on $V'_{spd}$ so as to keep $V'_{spd}$ equal to $V_{spd}$. When $V_{spd}$ rises above 2.8 v, so that $V'_{spd}$ is less than $V_{spd}$, the reaction of U9 is to raise its output, $V_{con}$. This is due to the relationship between the summing junction voltages of an op amp and its output, and is the reason for the use of the terms "inverting" (−) junction and "non-inverting" (+) junction. The action of $V_{con}$ through R6 causes $V'_{spd}$ to rise as $V_{con}$ rises. This continues until $V'_{spd}$ is again equal to $V_{spd}$, so that an equilibrium is reached. R6 has a relatively large value, so that $V_{con}$ must increase from zero to 12 v as $V'_{spd}$ increases very little, from 2.8 v to 3.2 v; this corresponds to an increase in the vehicle speed from 56 to 64 mph. This assumes that $V''_{pos}$ remains constant at 9 v. The resistance values are such that the graph of FIG. 12 results. This total range of values for $V_{con}$ is only important for other purposes, however; for position control, $V_{con}$ changes over a very limited range, as will be explained shortly. R5 is present to ensure that $V_{con}$ can be pulled down to zero volts when this is needed.

By adjusting R8, the 56 mph onset point, where $V_{con}$ starts to increase, can be changed. For instance, $V_{con}$ can be made to increase from zero to 12 v for a vehicle speed of 60 to 68 mph by reducing R7. Also, if $V''_{pos}$ remains constant, but at 3 v instead of 9 v, then $V_{con}$ increases from zero to 12 v for a vehicle speed of 53 to 61 mph. The 8 mph speed interval (56 mph to 64 mph) will remain essentially constant. Capacitor C6 acts to reduce the ripple voltage on $V_{con}$ due to the ripple voltage on $V_{spd}$, by providing a low impedance path around R6 at high frequencies.

$V_{spd}$ and $V_{con}$ are also used for force control, as explained later. For position control, $V_{con}$ is only used about a very limited range of values to switch the solenoid valves on and off. This is achieved as follows.

Assuming that voltage comparator U2 (used for force control) is an open circuit, resistor R4 simply passes through the voltage, so that $V'_{con} = V_{con}$, and this voltage appears on the inverting junctions of comparators U7 and U8. The combination of R4 and C11 add additional filtering on any high frequency ripple voltage not removed by filter C6.

R36, R37 and R38 establish 0.9 v and 1.2 v on the non-inverting junctions of U8 and U7, respectively.

Now assume that $V'_{con}$ is less than 0.9 v. The voltage on the inverting junction is lower than the voltage on the non-inverting junction of both U8 and U7. Therefore the action of both U8 and U7 is to disconnect their outputs from ground via an internal switching transistor, and the 12 v through R39 and R40 will raise the outputs of U8 and U7 to be at or near 12 v. Power MOSFET transistors Q3 and Q2 therefore conduct, and solenoid coils L2 and L1 are then energized. Coil L2 controls the retract solenoid valve 58, with the coil being energized meaning that the valve connecting the conduit 56 to atmosphere is open. The actuator 33, 34 will retract due to the force of the operator's foot and therefore the pedal is depressed to increase the distance "X". Coil L1 controls the extend solenoid, with the coil being energized meaning that the intake valve to the servo pump is held open and no air is pumped to the actuator.

If $V'_{con}$ is between 0.9 v and 1.2 v, the output of U8 switches to ground, Q3 stops conducting, L2 is deenergized and the retract solenoid valve 58 closes. The air in the conduit 56 is therefore trapped, so the actuator 33, 34 is prevented from moving. Coil L1 remains energized as before so that the ball check 61 is spaced from the seat therefor.

If $V'_{con}$ is more than 1.2 v, the output of U7 switches to ground, Q2 stops conducting, L1 is deenergized and the extend solenoid 59 no longer holds the intake valve 61 of the servo pump 49 open. The servo pump 49 therefore pumps air into the conduit 56 so that the actuator 33, 34 will extend and the pedal 18 be pushed upwards. Coil L2 is still de-energized at this point.

R35 and R42 have very large resistance values, and create a small "positive feedback" or latching action on U7 and U8, so that these devices do not tend to switch up and down due to any residual ripple voltage or noise that is present on the input junctions.

The important point about the previous paragraphs is that the pedal will be depressed if $V'_{con}$ (and therefore $V_{con}$) is less than 0.9 v and raised if $V'_{con}$ is greater than 1.2 v, and this corresponds to $V_{spd}$ being 2.83 v and 2.84 v respectively. This is a very narrow range of voltage and corresponds to the speed being between 56.6 mph and 56.8 mph. For many purposes, we can ignore this range and consider that the net effect is for the pedal to be depressed if the speed is below a reference speed of 56.7 mph, and raised if it is above the reference speed. The purpose of the 0.2 mph "dead spot" will be explained shortly.

The next step is to finally show how the above characteristics combine with other circuitry to control the pedal position in the desired manner.

All of the above assumes that $V'''_{pos}$ remains constant at 9 v, but it actually varies as the pedal position "X" varies. This occurs due to the variation of $V'_{pos}$, which in turn varies with $V_{pos}$, which in turn varies with R3, the resistance associated with the position transducer measuring the pedal position. When the pedal is fully down (X=2"), $V_{pos}$ is at ground. As the pedal moves up, $V_{pos}$ increases as R3 interposes its increasing resistance between ground and the non-inverting junction of U5. This voltage rise occurs due to the fixed resistor R15 between the junction and 7.56 v. When the pedal is fully up (X=0), $V_{pos}$ is 1 v. The variation of $V_{pos}$ between the two voltage extremes is to a good approximation a linear function of the pedal position. The resistance elements R13 and R16 associated with U5 make it act as an amplifier and buffer for $V_{pos}$, resulting in the voltage $V'_{pos}$. As $V_{pos}$ varies from zero to 1 v, $V'_{pos}$ varies proportionately from zero to 6 v. For later purposes, it should be noted that this implies the following formula; $V'_{pos}=6-3X$.

U5 is a comparator, like U7 and U8, but is used as an op amp, like U9. It is characterized by the op amp attempting to keep the inverting junction voltage equal to the non-inverting junction voltage by appropriate changes in its output. R14 is required to energize the action of U5, enabling it to put out the required voltage level. R11 performs the same function for U6.

$V'_{pos}$ is fed to U6 and results in the output $V''_{pos}$ by the action of C7, R43, R24 and R12. If $V'_{pos}$ does not change too quickly, $V''_{pos}$ varies from 5 to 7 v (6±1 v of the voltage is expressed as a steady component plus and minus a symmetrically varying component), as $V'_{pos}$ varies from zero to 6 v (3±3 v), i.e. a reduction by a factor of three in the range of variation, with an added bias of 3 v on the steady component of the voltage due to the effect of R24 being connected to 7.56 v. (The added bias is actually 5 v instead of 3 v, since the gain reduction of 3 v implies that $V''_{pos}$ would be 1±1 v without the bias.) If $V'_{pos}$ varies smoothly and quickly but in a cyclic manner between 0 and 6 v, $V''_{pos}$ tends to vary through a 3 to 9 v range (6±3 v), i.e. a range of variation equal to the 3±3 v variation of $V'_{pos}$. If $V'_{pos}$ has settled down at zero v but then jumps up to 6 v, $V''_{pos}$ starts out at 5 v, jumps up to 11 v but then settles gradually down to 7 v; if $V'_{pos}$ then jumps back to zero v, $V''_{pos}$ jumps from 7 down to 1 v, but then gradually increases to 5 v. This provides the necessary transition between the two modes of operation.

For purposes of initial explanation, we shall first examine what occurs when the second of the above cases results, and $V''_{pos}$ varies through a 3 to 9 v range. ($V'_{pos}$ is also used for force control, as explained later, and explains why some of the specific circuitry is used.)

It was previously established that, if the speed is less than 56.6 mph, $V_{spd}$ is less than 2.83 v, $V_{con}$ drops proportionately to less than 0.9 v so that $V'_{spd}$ will remain equal to $V_{spd}$. At the same time, the pedal is depressed due to the effect of $V_{con}$ on the solenoid valves. This was all based on assuming that $V''_{pos}$ remained at 9 v, but as the pedal is depressed, this voltage actually reduces, as has just been described. The effect of a reduction in this voltage is to attempt to reduce $V'_{spd}$, because of the connection to $V''_{pos}$ through R10. This is another example of "feedback". Due to the action of U9, this must cause $V_{con}$ to again rise, eventually to just above 0.9 v, and the result of this is to cause the pedal to stop moving. It should be evident that, as the speed, and thus $V_{spd}$, drops to lower and lower values, a series of conditions will exist, where the pedal will be increasingly depressed as the speed is reduced. Full depression of the pedal causes a drop in $V''_{pos}$ from 9 to 3 v (a change in X from zero to 2"), and the value of R10 is such that this must have resulted from a drop in $V'_{spd}$ from 2.83 v to 2.68 v. Since $V_{spd}$ is equal to $V'_{spd}$ during all this, the vehicle speed must have dropped from 56.6 mph to 53.6 mph. This is exactly the characteristic as shown by the graph of FIG. 9, that we initially stated we wanted to achieve. (Note that $V_{con}$ is always equal to 0.9 v at each equilibrium condition.)

The foregoing would correspond to a situation where the vehicle encounters a steep hill, causing the vehicle to slow down; the pedal will therefore be depressed until the engine is able to develop enough power to maintain speed.

It should be evident that when the top of the hill is reached and a downgrade is encountered that the vehicle will speed up, $V_{con}$ will rise to more than 1.2 v, the actuator 33, 34 will cause the pedal to rise, and essentially the same relationship between pedal position and speed will be achieved for the case of increasing speed, except that $V_{con}$ remains at 1.2 v rather than 0.9 v.

Since X cannot go below zero or above 2", variations in $V_{spd}$ above 56.6 or below 53.6 mph are responded to by variations in $V_{con}$, as previously described for constant $V''_{pos}$.

The purpose of the 0.3 v dead spot, where $V_{con}$ can cause the pedal to neither raise nor lower, is to keep the solenoid valves from being cycled continuously once the proper relationship between pedal position and speed is achieved. This will extend the life of the mechanical components. As stated before, this dead spot corresponds to a change in $V_{spd}$ of 0.01 v, which is a speed range of only 0.2 mph. There is a corresponding variation in pedal position, where the pedal can be moved without causing a reaction from the control circuit. This amounts to only a 0.4 v variation in $V''_{pos}$, and this corresponds to 0.133 inches of pedal travel.

If the dead spot is too small, it is still possible for the solenoid valves to continuously cycle. The tendency to do this is measured by the "gain" of the combination of coil drive, solenoid valve and actuator, and is determined as follows. The actuator moves the pedal down at a range of +2 inches per second when $V'_{con}$ is 0.9 v, and moves the pedal up at -2 inches per second when $V'_{con}$ is 1.2 v. The total change in pedal speed is 4 inches/second, and the change in voltage is 0.3 v. The gain is therefore 4/0.3 or 13.3 inches/second per volt. With the other gains involved, this results in a "loop gain" of 30/seconds, a quantity that is used by those familiar with "feedback control theory" to analyze dynamic behavior of control devices such as the position control.

We can now state what happens when the pedal position varies slowly enough so that, instead of $V''_{pos}$ being equal to $V'_{pos}+3$ v, the variation in $V''_{pos}$ is only one third as much; $V''_{pos}=V'_{pos}/3+5$. The pedal will go from full down at 54.6 mph full up at 55.6 mph, as $V''_{pos}$ varies from 7 down to 5 v. Instead of there being a 3 mph speed variation, there is then only a 1 mph variation. This is desirable from the point of view of very accurate control over the speed, and will be the situation that occurs except when there are very sudden changes in operating conditions. The dead spot in pedal travel is therefore reduced to 0.044 inches. The reason for having the larger speed variation at all has to do with the stability of control; if the speed range remains small for quick variations in speed (loop gain equal to 90/seconds), the vehicle speed may cycle about the desired point instead of settling down.

To summarize, position control is accomplished by the following steps:

1. A voltage analog of the vehicle speed, $V_{spd}$, is created;

2. A control voltage, $V_{con}$, is then created, which causes the pedal to move up or down based on whether a certain reference speed (56.7 mph when $V''_{pos}$ is 9 v) is exceeded or not; and 3. A voltage analog of the pedal position, $V_{pos}$, is created and used to vary $V_{con}$ in such a way as to establish the desired relationship between pedal position and vehicle speed.

Force Control

Basically, the force on the pedal is limited to a maximum specified level by controlling the air pressure in the actuator. In this embodiment, the piston area of the actuator is 1 inch$^2$, so that the conversion factor is "1 psi equals 1 pound of force". If the driver exerts enough force to urge the pedal down against the throttle return spring, but not enough to exceed this maximum, then the position control circuit maintains the pedal position as previously described. Only if he tries to overpower the position control does the force control come into action.

The force control circuit consists of three parts: the first part generates a voltage which corresponds to the actual pressure in the actuator; the second part generates a voltage which corresponds to the maximum allowable pressure; the third part compares these two voltages and changes the voltage $V'_{con}$ so that it is no longer equal to $V_{con}$. This latter action is done in such a way that the pressure is prevented from exceeding the maximum specified pressure.

Generation of the actual pressure voltage will be described first. The voltage $V'_{hal}$ will cyclically vary as $V_{hal}$ varies due to the coupling of C1. The effect of diode D1 will be to shift the level of this voltage so that its minimum value will always dip to $-0.5$ v with respect to ground. This voltage is then averaged by the action of R17 and C9 and appears as $V_{prs}$ on the non-inverting junction of U1.

The Hall effect transducer 116 is mounted on a diaphragm 113 whose interior is supplied with the pressure to be measured. When this pressure increases, the diaphragm 113 expands, moving the Hall device 116 closer to the magnets 102 on the flywheel 96. The magnetic field seen by the Hall device 116 thus increases and this causes a greater excursion in the voltages $V_{hal}$ and thus $V'_{hal}$. Since $V'_{hal}$ is always reference to $-0.5$ v, this greater excursion will result in a predictable increase in the average voltage $V_{prs}$. The result is that at zero psig (atmospheric pressure) $V_{prs}$ is 1 v, and at 50 psi pressure above this, $V_{prs}$ is 2 v. Between these two extremes $V_{prs}$ is to a good approximation a linear function of the pressure.

The action of U1 in conjunction with R18, R20 and R44 is to act as an amplifier, buffer and bias shift of $V_{prs}$, such that the output of U1, $V'_{prs}$, represents the pressure with a calibration of 0.15 v/psi and measuring zero volts at 14 psig (28.7 psia). In other words, $V'_{prs}=0.15(P-14)$, where P is the pressure in psi. Capacitor C8 filters the ripple voltage that remains on $V_{prs}$. R21 supplies the necessary current and voltage for U1 to operate.

Calibration is achieved in the following manner. As initially installed, due to tolerances, the Hall device 116 will cause $V'_{prs}$ to have a gain that differs from 0.15 v/psi, and to have a bias at 14 psig. The physical distance of the Hall device 116 from the magnets 102 at 14 psig is first adjusted to eliminate the bias. The adjustment of the Hall device 116 is facilitated by the fact that its center grounding terminal is soldered to the surface of the metal diaphragm in such a way that it acts as a mounting leg 117 (FIGS. 16 and 17) which can be bent to adjust the distance. The value of $V'_{prs}$ at 14 and 50 psi is then measured, with R19 not installed. A value of R19 is calculated which will give the correct gain, and this is installed. It may be necessary to readjust the bias or to repeat the entire procedure one or more times before both the gain and bias are satisfactory, since adjustment of one somewhat affects the other.

Generation of the maximum pressure voltage will now be described. The voltage $V_{mps}$ at the non-inverting junction of U3 is generated so as to represent the maximum pressure as implied by the vehicle speed. This is obtained by applying $V_{spd}$ through R27 and $V_{con}$ through R25; in combination with R45, the resistors have values such that $1.413V_{mps}$ is equal to the sum $V_{spd}+0.1V_{con}$. The voltage $V_{spd}+0.1V_{con}-1.4$ is the voltage which represents the desired maximum pressure function, with a conversion factor of 0.1 v/psi. (The 1.413 factor is necessary for later purposes.) With $V_{spd}$ and $V_{con}$ being functions of speed according to the graphs of FIGS. 11 and 12, the graph of FIG. 10 results. This is the basic force function. The value of this function above 56 mph, where the steeper gain starts, is the only part that will actually be used. The main characteristic is that there is a steep force gradient from 56 to 64 mph, and a less steep gradient beyond 64 mph.

A superimposed change in the force due to the pedal position has been referred to. This is the same as if a spring were installed in the actuator, urging the piston downward, and for this reason is referred to as a pseudo spring force. It is intended that this spring have a rate of 6 lb/in. This is accomplished as follows. $V'_{pos}$ is applied to the inverting junction of U3 through R26, at the same time as the output of U3 is connected to this junction through R22. The values of these resistors are such that $V_{mpsx}$ is equal to the sum $V_{spd}+0.1V_{con}-0.2V'_{pos}-1.6$. As with $1.413V_{mps}$, $V_{mpsx}$ represents a pressure function with a conversion factor of 0.1 v/psi. The bias of 1.6 v is provided by the use of 7.56 v supplied through R29. Since $V'_{pos}$ as previously noted can be represented by the formula $6-3X$, we can state that the quantity $V_{mpsx}$ is equal to the sum $V_{spd}+0.1V_{con}+0.6X-2.8$. In other words, the pressure function of FIG. 10 has added to it an additional voltage equal to 0.6 v/inch pedal motion. This represents 6 lb/in pedal force, and is the desired relationship. The purpose of the bias is so that the value of $V_{mpsx}$ is zero when the maximum pressure is 14 psi (which occurs at 56 mph, $V_{spd}=2.8$, $V_{con}=X=0$); this value can be changed by changing R29. To summarize, $V_{mpsx}=V_{spd}+0.1V_{con}+0.6X-2.8$. This represents the maximum pressure where the voltage is zero when the pressure is 14 psig and the gain is 0.1 v/psi. In other words; $V_{mpsx}=0.1(P_{max}-14)$, where $P_{max}$ is the maximum allowable pressure. Note that the op amp voltage cannot be less than zero; if a negative voltage is called for by the equation, the voltage will actually be zero.

U3 was assumed to be able to respond to the voltages on its summing junctions. This can only happen if there is a source of sufficient current and voltage attached to its output. This will occur if the current flow through D2 due to R32, which is attached to 12 v, is not otherwise used up. Noting that U3 and U4 have their outputs connected together, if the output of U4 is not internally grounded, then the current due to R32 can indeed be used to generate $V_{mpsx}$. This in turn is related to what the output of U4 would be if its output weren't connected to U3. This output voltage is designated as $V_{tim}$, and this voltage will actually exist if the output of U3 is not internally grounded. It should thus be evident that $V_{max}$, the actual output of U3 and U4, will be either $V_{mpsx}$ or $V_{tim}$, whichever is smaller.

Just as $V_{mpsx}$ represents the maximum allowable pressure on the basis of speed and pedal position, $V_{tim}$ represents the maximum pressure on the basis of time. The reasons for having the maximum pressure depend on time are as follows. Assume that the driver has been driving along, pressing just hard enough on the pedal so that the position control function will be active. The vehicle will maintain a speed of 54.6 to 55.6 mph, depending on the amount of pedal depression needed to cause the engine to put out sufficient power to overcome the various loads on the drive train. The driver then attempts to pass a vehicle he has caught up with, and for various reasons he really needs to speed up significantly. Assuming the pressure control works as intended, he will immediately have to exert a force of 14 pounds, just to exceed the pedal position called for by the position control function. As his speed increases to 64 mph, the force he has to exert would have to significantly increase if it were to be in accordance with the graph of FIG. 10. This is not desirable, since this is legitimate speeding, and the driver's attention may be diverted, from the task of safely passing the other vehicle, to what is happening to the force on his foot.

Figure 14:
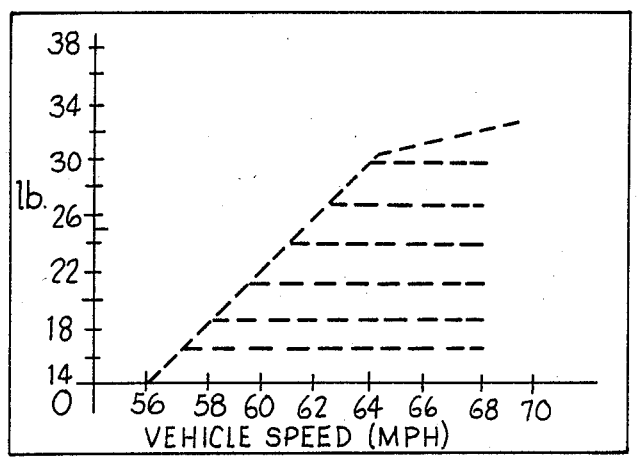
FIG. 14 is a further graph illustrating a time delay characteristic incorporated into the electrical schematic illustrated in FIG. 13.

The passing phenomenon is marked by the fact that it takes place over a limited time interval. What is needed is for the force to remain constant at 14 pounds for 30 seconds and then increase gradually, if such is indicated by the value of $V_{mpsx}$, over another 60 seconds. This is indicated in FIG. 14 and is accomplished as follows.

We shall first explain the variation with time of $V_{int}$, the voltage on the non-inverting junction of U4. Due to the connection to $v_{con}$ through R34, $V_{int}$ is normally equal to $V_{con}$. For pedal position control, $V_{con}$ is in the range of 0.9 to 1.2 v, as it is used to trigger the solenoid valves. If the speed increases to 60 mph, $V_{con}$ increases to 6 v. Due to the action of C10, $V_{int}$ rises only slowly, taking 30 seconds to reach 1.6 v and about another 60 seconds to reach 2.5 v; this can be described mathematically as roughly corresponding to an "integrating" action. The reaction of U4 to $V_{int}$ is determined by gain resistors R31 and R33 and bias resistor R30; when $V_{int}$ is 1.6 v or less, $V_{tim}$ is zero; when $V_{int}$ is 2.5 v, $V_{tim}$ is 3.6 v. Between these extremes, the relationship is a linear one. Now, just as $V_{mpsx}$ corresponds to a maximum pressure, so does $V_{tim}$. When $V_{tim}$ is zero, the corresponding pressure is 14 psi, and when $V_{tim}$ is 3.6 v, the corresponding pressure is 50 psi. This is based on an 80 mph maximum speed so that $v_{spd}=4.0$ $V_{con}=12$, $X=2$; therefore the equation for $V_{mpsx}$ gives 3.6 v.

Realizing that the real maximum pressure is $V_{tim}$ or $V_{mpsx}$, whichever is smaller, the maximum pressure will first be determined by $V_{tim}$, which is held at zero volts or 14 psi for 30 seconds while $V_{int}$ builds up to 1.6 v. The maximum pressure then increases linearly with time, up to 50 psi or whatever is called for by the speed as indicated by $V_{mpsx}$. The actual voltage that exists on the output of U3 and U4 will be designated $V_{max}$.

If the passing speed is less than 60 mph, $V_{max}$ will take longer to build up. If it is greater than 60 mph, $V_{max}$ buildup will take less. This is desired since a lower passing speed means a longer passing time and vice versa. Once the passing procedure is completed and the speed is brought back down to 56 mph, $V_{con}$ will drop down to the normal 0.9 to 1.2 v range. Since $V_{int}$ is now smaller, current can flow through diode D3, discharging C10 rapidly at least until $V_{int}$ is no more than 0.5 v higher than $V_{con}$. This provides for rapid reset of the time delay and will allow the driver to perform another passing procedure without encountering excessive resistance. The final 0.5 v drop in $V_{int}$ must be discharged through R34 over about 30 seconds time, which means that if the driver immediately speeds again, the delay before the pressure starts to build up is eliminated; this prevents him from using such a procedure to defeat the purpose of the deaccelerator.

We are now ready to describe the part of the force control circuit which compares the maximum pressure voltage with the actual pressure voltage and acts to limit the actual pressure to the maximum.

$V_{max}$ will appear at the non-inverting junction of U2, with an added bias of 0.5 v due to D2; thus the voltage at this junction never drops below 0.5 v. $V'_{prs}$ is applied to the inverting junction through R23, and the output of U2 is fed back through R28. If U2 is able to generate the required output as implied by these connections, the resistance values can be chosen such that; $V'_{con}=3(V_{mpsx}-0.667V'_{prs})+1.5$. If the pressure equivalents for $V_{mpsx}$ and $V'_{prs}$ are substituted; $V'_{con}=0.3(P_{max}-P)+1.5$. This will turn out to be the desired relationship; it means that $V'_{con}$ decreases by 0.3 v for every psi that the actual pressure exceeds the maximum, and that it operates with a bias of 1.5 v.

Assume that $V'_{con}$ drops below 0.9 v in accordance with the equation just given, because P rises above 16 psi and $P_{max}$ is at 14 psi. U8 goes high, which ultimately causes the pressure in conduit 56 to connect to atmosphere as previously explained. Since the driver holds the pedal at a certain position, the air pressure P will drop instead of the pedal moving downward. When this pressure reaches 16 psi, the value of $V'_{con}$ rises to 0.9 v. In accordance with the circuits just described, the connection to atmosphere is again closed, and the pressure then stops changing. Conversely, if the pressure drops below 15 psi, $V'_{con}$ is above 1.2 v, the servo pump ports air to the conduit 56, increasing the pressure. We thus have another feedback loop, in which the pressure is maintained between 15 and 16 psi when $P_{max}$ is 14 psi. The 1 to 2 psi apparent discrepancy between the actual and maximum pressure does not actually exist, since the ultimate intent was to control the initial pressure to an average of 15.5 psi, and the 14 psi number has been used merely for clarity of explanation. It should be evident that the circuits will act to control the pressure to 1 to 2 psi above $P_{max}$ for any value of $P_{max}$.

All the above assumes that $V'_{con}$ can be controlled by U2; this means that $V_{con}$ must be above 1.2 v, since flow of current through R4 is the source of current for the operation of U2. This situation will always be associated with the driver overpowering the position control.

The 1 psi dead spot in the control of the pressure serves the same purpose as the dead spot in the position control; if the dead spot is too small, the solenoid valves may cycle continuously. The gain which measures the tendency to do this is determined as follows. The pressure increases at $+30$ psi/sec when $V'_{con}$ is 0.9 v, and reduces at $-30$ psi/sec when $V'_{con}$ is 1.2 v. The total change in pressure rate is 60 psi/sec, and the voltage change is 0.3 v. The gain is therefore 200 psi/sec per volt. With a stated gain of 0.3 v/psi ior the rest of the loop, this results in a loop gain of 60/sec.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for maintaining the rotative speed of a rotatable member at a value selected by the operator, comprising:

a pneumatic pumping means operatively connected to said rotatable member;

an inflatable diaphragm member inflatable by said pneumatic pumping means;

a transducer means fastened to the periphery of said inflatable diaphragm member for converting a fluctuating magnetic field into an electrical signal proportional to the frequency of fluctuation and magnitude of the field strength of a magnetic field;

a disk member supported for rotation and having a peripheral portion thereof adjacent but spaced from said transducer means;

means for drivingly rotating said disk at a speed proportional to the rotative speed of said rotatable member;

plural magnet means mounted on said peripheral portion of said disk member whereby said transducer means becomes responsive to the magnetic field of said plural magnet means passing thereby to produce said electrical signal;

means for inflating and deflating said diaphragm member in proportion to the rotative speed of said rotatable member to cause said transducer means to be moved toward and away from said plural magnet means to thereby increase and decrease the magnitude of the field strength in conjunction with an increase and decrease in frequency of the fluctuations of said magnetic field whereby said electrical signal is rendered proportional to the rotative speed of said rotatable member; and means responsive to said electrical signal for maintaining said rotative speed of said rotatable member at said selected value.

2. A device for maintaining the speed of a vehicle at a value selected by the operator, comprising:

position control means responsive to an application of a force to a foot pedal member for maintaining the speed of said vehicle at a value selected by the operator, said position control means comprising:

a pneumatic pumping means operatively connected to a vehicle speed indicating member;

an inflatable diaphragm member inflatable by said pneumatic pumping means;

a transducer means fastened to the periphery of said inflatable diaphragm member for converting a fluctuating magnatic field into an electrical signal proportional to the frequency of fluctuation and magnitude of the field strength of a magnetic field;

a disk member supported for rotation and having a peripheral portion thereof adjacent but spaced from said transducer means;

means for drivingly rotating said disk at a speed proportional to the velocity of said vehicle;

plural magnet means mounted on said peripheral portion of said disk member whereby said transducer means becomes responsive to the magnetic field of said plural magnet means passing thereby to produce said electrical signal;

means for inflating and deflating said diaphragm member in proportion to the speed of said vehicle to cause said transducer means to be moved toward and away from said plural magnet means to thereby increase and decrease the magnitude of the field strength in conjunction with an increase and decrease in frequency of the fluctuations of said magnetic field whereby said electrical signal is rendered proportional to the speed of said vehicle; and means responsive to said electrical signal for yieldably blocking movement of said foot pedal member toward a depressed condition and, by urging said foot pedal member to a position whereat further movement thereof is blocked, maintaining said speed of said vehicle at said selected value.

3. The speed control device according to claim 2, wherein a housing member is provided into which is mounted said pumping means, said inflatable diaphragm, said transducer means and said disk with said plural magnets thereon.

4. The speed control device according to claim 3, wherein said means responsive to said electrical signal includes:

a first electromagnetic solenoid valve means for controlling the input of pressure medium to said inflatable diaphragm member;

a second electromagnet solenoid valve means for controlling the bleed off of pressure medium from said inflatable diaphragm member;

electrical circuit means for converting said electrical signal into control signals for effecting an energizing of a selected one of said first and second solenoid valves in response to the magnitude and frequency of said electrical signal determined by the extent to which said inflatable diaphragm member is inflated; and wherein said housing additionally houses said first and second eletromagnet solenoid valve means.

5. The speed control device according to claim 4, wherein said means responsive to said electrical signal includes further means for effecting the application of a preset and constant force yieldably blocking movement of said foot pedal member toward a depressed position when the speed of said vehicle is less than a preset value, which force must be overcome by operator applied force to said foot pedal member in order to effect an acceleration of said vehicle.

6. The speed control device according to claim 3, wherein said position control means includes a cylinder mounted beneath said foot pedal member, which cylinder has a piston slidably disposed therein, said piston having a piston rod operatively engageable with the underside of said foot pedal member to thereby yieldably block movement of said foot pedal member only when said foot pedal member is positioned to cause the vehicle to achieve a speed which is greater than a range of speeds at and just slightly below said preset speed; and wherein conduit means are provided on said housing for connecting said pneumatic pumping means in fluid circuit to said inflatable diaphragm member, said first and second electromagnet solenoid valve means and said cylinder on a side of said piston remote from said piston rod.

7. The speed control device according to claim 3, wherein said means responsive to said electrical signal includes:
   a first electromagnetic solenoid valve means for controlling the input of pressure medium to said inflatable diaphragm member;
   a second electromagnet solenoid valve means for controlling the bleed off of pressure medium from said inflatable diaphragm member;
   electrical circuit means for converting said electrical signal into control signals for effecting an energizing of a selected one of said first and second solenoid valves in response to the magnitude and frequency of said electrical signal determined by the extent to which said inflatable diaphragm member is inflated;
   wherein said housing additionally houses said first and second electromagnet solenoid valve means;
   wherein said position control means includes a cylinder mounted therebeneath, which cylinder has a piston slidably disposed therein, said piston having a piston rod operatively engageable with the underside of said foot pedal member to thereby yieldably block movement of said foot pedal member toward a depressed condition only when said foot pedal member is positioned to cause the vehicle to achieve a speed which is greater than a range of speeds at and just slightly below said preset speed; and
   wherein conduit means are provided on said housing for connecting said pneumatic pumping means in fluid circuit to said inflatable diaphragm member, said first and second electromagnet solenoid valve means and said cylinder on a side of said piston remote from said piston rod.

8. A speed control device for a vehicle powered by an engine in which fuel supplied thereto is controlled by the operator depressing and releasing a foot pedal member in an operating range from a fully depressed position supplying maximum fuel to said engine to a fully raised position supplying minimum fuel to said engine, comprising:
   first means for yieldably blocking movement of said foot pedal member by applying a predetermined initial resistance to depression of said foot pedal member when said engine of said vehicle is in a running condition and said vehicle is moving within a range of speeds at and just slightly below a preset speed, said predetermined resistance being greater than a normal resistance to depression of said foot pedal member;
   second means for progressively increasing the resistance to depression of said foot pedal member above said predetermined resistance in response to and as a function of progressive increases of the velocity of said vehicle above said preset speed and independent of the position of said foot pedal member, so that the operator of the vehicle must exert progressively increasing pressure to further depress said foot pedal member as the velocity of said vehicle is increased above said preset speed;
   third means for reducing the resistance to depression of said foot pedal member in response to and as a function of a decrease of the velocity of said vehicle from a speed higher than said preset speed toward said preset speed and independent of the position of said foot pedal member, so that the driver is constrained to reduce the occurrence and duration of vehicle operation at velocities over said preset speed; and
   position control means responsive to an application of a force to said foot pedal member which is greater than said normal force but less than said initial force for altering the position whereat said yieldable blocking of said foot pedal member occurs to effect a maintaining of the speed of said vehicle at a value selected by the operator, said position control means being capable of being manually overridden to increase vehicle speed by depressing said foot pedal member beyond a blocking position to effect an increase in vehicle speed but subject to the function of said second and third means.

9. The speed control device according to claim 8, wherein said position control means includes a cylinder mounted beneath said foot pedal member, which cylinder has a piston slidably disposed therein, said piston having a piston rod operatively engageable with the underside of said foot pedal member to thereby yieldably block movement of said foot pedal member toward a depressed position only when said foot pedal member is positioned to cause the vehicle to achieve a speed which is greater than said preset speed or a speed within said range; and
   fourth means for controlling the position of said piston as a function of the vehicle speed.

10. The speed control device according to claim 9, wherein the position of said piston is always capable of being overpowered by said foot pedal but subject to the force conditions imposed by said first means, said second means and said third means.

11. The speed control device according to claim 8, including delay means for delaying for an interval of time the activation of said second means and said position control means in response to a depression of said foot pedal member and the speed of said vehicle exceeding said preset speed to enable the operator to comfortably pass another vehicle without having to exert a greater force on said foot pedal member.

12. The speed control device according to claim 8, wherein decreases in vehicle speed within said range, such as when traveling up a hill, result in said position control mean altering the position whereat said foot pedal member is yieldably blocked so that the foot force will further depress said pedal to increase the engine torque until said engine torque meets the load requirement determined by the vehicle going up the hill whereupon said position control means alters the position whereat said foot pedal member is yieldably blocked to offset the foot force.

13. The speed control device according to claim 8, wherein said preset speed is approximately the national speed limit.

14. The speed control device according to claim 13 wherein said range is a three mile per hour range including said national speed limit.

15. In a method of controlling the speed of a vehicle powered by an engine which the fuel for operating the engine and controlling the engine speed is controlled by depressing and releasing an accelerator pedal, the improvement which comprises: yieldably blocking movement of the acceleration pedal toward a depressed position by applying a predetermined initial resistance to depression of the accelerator pedal greater than a normal resistance when the speed of the vehicle is within a range of speeds at and just slightly below a preset speed, progressively increasing the resistance to depression of the accelerator pedal above said predetermined initial resistance in response to and as a function of progressive increases of the velocity of said vehicle above said preset speed and independent of the position of the accelerator pedal, so that the driver of said vehicle must exert progressively increasing pressure to further depress the accelerator pedal as the velocity of said vehicle is increased above said preset speed, and reducing the resistance to depression of the accelerator pedal in response to and as a function of a decrease of the velocity of the vehicle from a speed higher than said preset speed toward said preset speed and independent of the position of the accelerator pedal, so that the driver is constrained to reduce the occurrence and duration of vehicle operation at velocities over said preset speed, controlling the position whereat said yieldable blocking occurs within said range of speeds, applying a force to said accelerator pedal greater than said normal force but less than said initial force to cause said accelerator pedal to be moved to the position whereat said yieldable blocking occurs and said vehicle to be moved at a selected velocity, and maintaining said selected velocity when said vehicle encounters additional resistance to forward movement and without varying the said force applied to said accelerator pedal.

16. The method of claim 15, including the step of delaying for an interval of time the increasing of the resistance to depression of said accelerator pedal and the maintaining of said selected velocity in response to a depression of said accelerator pedal and the speed of said vehicle exceeding said preset speed to enable the operator to comfortably pass another vehicle without having to exert to a greater force on said accelerator pedal.

17. The method according to claim 15, wherein said preset speed is approximately the national speed limit.

18. The method according to claim 17, wherein said range is a three mile per hour range including said national speed limit.

19. A position control device for use in association with a foot pedal member controlling
   an elongated and hollow chamber means;
   an actuator piston slidably disposed in said chamber means and movable between first and second positions therein, said first position corresponding to a position of maximum fuel supply to said engine;
   means separately supporting said foot pedal member for movement between third and fourth positions but permitting an operative connection of said foot pedal member to said actuator piston for movement along a path, said fourth position representing a position of maximum fuel supply to said engine; and
   position control means for controlling the position of said actuator piston between said first and second positions and in response to a range of vehicle speeds at and just slightly below a preset speed.

20. The position control device according to claim 19, wherein said vehicle includes a speed indicating means, wherein said position control means further includes a pumping means driven in common with said speed indicating means, pumping bypass means for controlling the pressure developed by said pumping means, and further means for controlling said pumping bypass means to effect a control of the position of said actuator piston in response to vehicle speed.

21. The piston control device according to claim 20, wherein said position control means further includes first means for producing a first signal indicating the actual position of said actuator piston and second means for producing a second signal indicating the desired position of said actuator piston, third means for producing a third signal indicating the maximum allowable pressure, fourth means for selecting the lowest of two signals, one signal representing the difference between said first and second signals and the other signal representing the difference between said first and third signals, and fifth means responsive to said lowest signal for achieving a closed loop control of said desired position and, failing that, limiting the pressure required to overpower said position of said actuator piston and exert closed loop control over said pressure.

22. The position control device according to claim 19, wherein said position control means includes a rotatable member, a Hall effect transducer, plural magnets mounted on and movable with said rotatable member past said Hall effect transducer to thereby convert an alternating voltage signal into a corresponding speed signal, means for varying the distance between said Hall effect transducer and said magnets in response to an air pressure representing a force on said foot pedal member, and means for converting the resulting changes in amplitude of said alternating voltage signal into a corresponding pressure signal.

23. The position control device according to claim 19, wherein said preset speed is approximately the national speed limit.

24. The position control device according to claim 23, wherein said range is a three mile per hour range including said national speed limit.

25. The position control device according to claim 19, wherein said position control means includes means for varying the position of said actuator piston linearly between said first and second positions and over said range of said vehicle speeds.

26. The position control device according to claim 25, wherein said range is a three mile per hour/range.

27. The position control device according to claim 25, wherein said first position of said actuator piston is fully retracted when said vehicle speed is at the lowest end of said range, and wherein said second position of said actuator piston is fully extended when said vehicle speed is at the highest end of said range.

28. The position control device according to claim 27, wherein said position control means includes means applying a predetermined initial force resisting movement of said actuator piston toward said first position greater in magnitude than a normal return force returning said foot pedal member toward said third position, and wherein said actuator piston, when located at said second position or intermediate said first and second positions, functions to limit the amount of foot pedal member movement from said third position toward said fourth position, an application of a force to said foot pedal member greater than said normal return force and less than said initial force causing said foot pedal member to connect with said actuator piston and move therewith to thereby effect a maintaining of the velocity of said vehicle within said range of speeds.

29. The position control device according to claim 28, wherein said initial force is yieldable to facilitate said actuator piston being urged toward said first position in response to said foot pedal member, when urged at a force greater than said initial force, moving toward said fourth position to increase the fuel supply to said engine, said actuator piston yielding to the aforesaid movement of said foot pedal member.

* * * * *

UNITED STATES PATENT AND TRADEMARK OFFICE
CERTIFICATE OF CORRECTION

PATENT NO. : 4 590 909

DATED : May 27, 1986

INVENTOR(S) : Richard P. Heintz

It is certified that error appears in the above-identified patent and that said Letters Patent is hereby corrected as shown below:

Column 27, line 42; after "controlling" insert ---the fuel flow to an engine of a vehicle, comprising:---

Signed and Sealed this

Seventh Day of October, 1986

[SEAL]

*Attest:*

DONALD J. QUIGG

*Attesting Officer*     *Commissioner of Patents and Trademarks*